(12) United States Patent
Livshutz et al.

(10) Patent No.: US 6,507,850 B1
(45) Date of Patent: Jan. 14, 2003

(54) SEGMENT AGGREGATION AND INTERLEAVING OF DATA TYPES IN A GEOGRAPHIC DATABASE AND METHODS FOR USE THEREOF IN A NAVIGATION APPLICATION

(75) Inventors: Michael Livshutz, Niles, IL (US); Richard A. Ashby, Blue River, WI (US); Paul M. Bouzide, Chicago, IL (US); Srinivasa Doddapaneni, Chicago, IL (US); Robert P. Fernekes, Cary, IL (US); Matthew Friederich, Berwyn, IL (US); Vijaya S. Israni, Hoffman Estates, IL (US); John C. Jasper, Arlington Heights, IL (US); Asta Kavakh, Lake Zurich, IL (US); William McDonough, Glen Ellyn, IL (US); James A. Meek, Palatine, IL (US); Senthil K. Natesan, Carol Stream, IL (US); Nicholas E. Smith, Oak Park, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/467,276

(22) Filed: Dec. 20, 1999

Related U.S. Application Data

(63) Continuation of application No. 09/039,583, filed on Mar. 16, 1998, now Pat. No. 6,038,559, and a continuation of application No. 09/039,586, filed on Mar. 16, 1998, now Pat. No. 6,112,200.

(51) Int. Cl.[7] ............................................. G06F 17/30
(52) U.S. Cl. .......................... 707/104; 707/100; 707/2; 707/4; 707/200; 701/208; 701/209; 701/214; 701/206; 701/201; 711/157; 711/173
(58) Field of Search ......................... 707/104, 1, 102, 707/200, 100, 4, 2; 701/208, 117, 200, 211, 202, 209, 207, 213, 206, 210, 217, 25, 212, 214; 711/157, 173; 340/995; 342/357.13, 457

(56) References Cited

U.S. PATENT DOCUMENTS 4,888,698 A    12/1989   Driessen et al.

(List continued on next page.)

FOREIGN PATENT DOCUMENTS

EP     0 838 661 A1    4/1998
WO     WO 98/27534     6/1998

*Primary Examiner*—Jean M. Corrielus
(74) *Attorney, Agent, or Firm*—Frank J. Kozak; Lawrence M. Kaplan

(57) ABSTRACT

A geographic database for use with a navigation application program that provides navigation features to an end-user. The geographic database includes a plurality of data records of a first type and a plurality of data records of a second type. The plurality of records of the first type are organized into a plurality of parcels, each of which includes a plurality of data records of the first type and the plurality of records of the second type are organized into a plurality of parcels, each of which includes a plurality of data records of the second type. The parcels of data records of the first type are interleaved with the parcels of data records of the second type. This interleaving enables navigation functions that use these different types to access these different types more quickly and efficiently, thereby enhancing navigation system performance. Also disclosed is a method for forming a geographic database that includes a plurality of data records that represent geographic features and which can be used in a navigation system. The method includes the step of interleaving parcels containing pluralities of data records of a first type with parcels containing pluralities of data records of a second type.

11 Claims, 14 Drawing Sheets

U.S. PATENT DOCUMENTS

| | | |
|---|---|---|
| 4,926,336 A | 5/1990 | Yamada |
| 4,954,959 A | 9/1990 | Moroto et al. |
| 4,972,319 A | 11/1990 | Delorme |
| 4,984,168 A | 1/1991 | Neukrichner et al. |
| 5,031,104 A | 7/1991 | Ikeda et al. |
| 5,036,471 A | 7/1991 | Tamura et al. |
| 5,168,452 A | 12/1992 | Yamada et al. |
| 5,285,391 A | 2/1994 | Smith et al. |
| 5,408,597 A | 4/1995 | Kita et al. |
| 5,440,730 A | 8/1995 | Elmasri et al. |
| 5,502,640 A | 3/1996 | Yagyu et al. |
| 5,513,110 A | 4/1996 | Fujita et al. |
| 5,515,284 A | 5/1996 | Abe |
| 5,519,619 A | 5/1996 | Seda |
| 5,528,501 A | 6/1996 | Hanson |
| 5,537,323 A | 7/1996 | Schulte |
| 5,710,915 A | 1/1998 | McElhiney |
| 5,754,846 A | 5/1998 | Janse et al. |
| 5,893,898 A | 4/1999 | Tanimoto |
| 5,953,722 A * | 9/1999 | Lampert et al. ............ 707/100 |
| 6,038,559 A * | 3/2000 | Ashby et al. .................. 707/4 |
| 6,112,200 A * | 8/2000 | Livshutz et al. ................ 707/4 |
| 6,118,404 A * | 9/2000 | Fernekes et al. ....... 342/357.13 |
| 6,121,924 A * | 9/2000 | Meek et al. ........... 342/357.13 |
| 6,122,593 A * | 9/2000 | Friederich et al. .......... 701/102 |
| 6,128,573 A | 10/2000 | Nomura |
| 6,184,823 B1 * | 2/2001 | Smith et al. ........... 342/357.13 |
| 6,188,957 B1 * | 2/2001 | Bechtolshiem et al. ..... 701/209 |
| 6,192,312 B1 * | 2/2001 | Hummelsheim ........... 701/118 |
| 6,199,013 B1 * | 3/2001 | O'Shea ....................... 701/211 |
| 6,208,934 B1 * | 3/2001 | Bechtolseim et al. ....... 701/209 |
| 6,212,474 B1 * | 4/2001 | Fowler et al. .............. 701/211 |

* cited by examiner

LOWEST RANKED SEGMENTS EARMARKED TO BE DROPPED

LOWEST RANKED SEGMENTS HAVE BEEN DROPPED

AFTER AGGREGATION

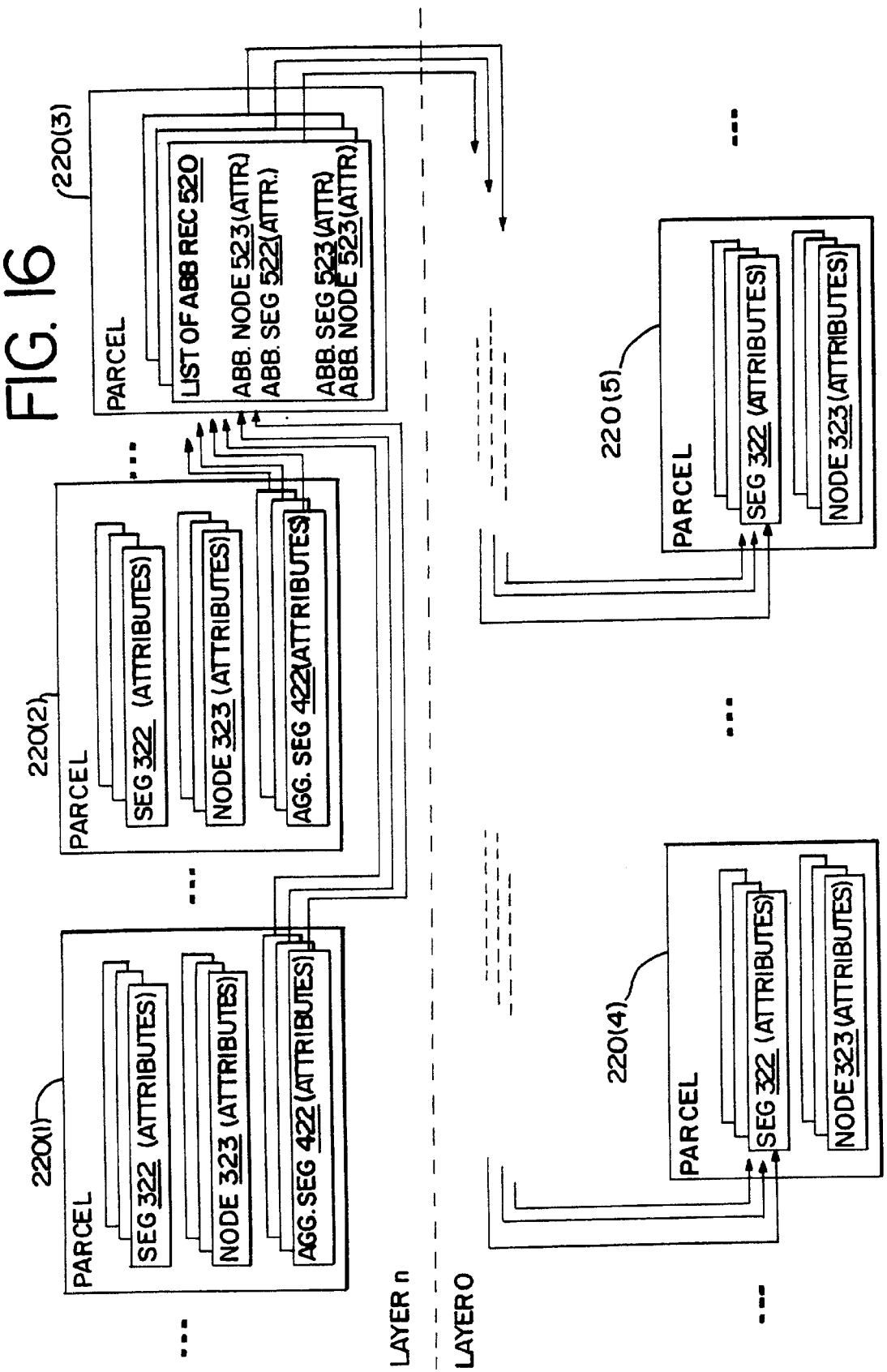

SEGMENT AGGREGATION AND INTERLEAVING OF DATA TYPES IN A GEOGRAPHIC DATABASE AND METHODS FOR USE THEREOF IN A NAVIGATION APPLICATION

REFERENCE TO RELATED APPLICATIONS

The present application is a continuation of Ser. No. 09/039,583, now U.S. Pat. No. 6,038,559 filed Mar. 16, 1998, and a continuation of Ser. No. 09/039,586, filed Mar. 16, 1998, now U.S. Pat. No. 6,112,200 the entire disclosures of which are incorporated herein by reference.

BACKGROUND OF THE INVENTION

The present invention relates to a system and method for facilitating access to and use of geographic data used with a navigation application program that provides navigating features and functions to an end-user, and more particularly, the present invention relates to a geographic database that includes geographic data of different types, each type of which is tailored to support one or more of the navigation functions and which operates with another of the different types, thereby facilitating certain navigation functions and enhancing performance.

Computer-based navigation application programs are available that provide endusers (such as drivers of vehicles in which the navigation systems are installed) with various navigating functions and features. For example, some navigation application programs are able to determine an optimum route to travel by roads between locations. Using input from an end-user, and optionally from equipment that can determine one's physical location (such as a GPS system), a navigation application program can examine various routes between two locations to determine an optimum route to travel from a starting location to a destination location in a geographic region. The navigation application program may then provide the end-user with information about the optimum route in the form of instructions that identify the maneuvers required to be taken by the end-user to travel from the starting location to the destination location. If the navigation system is located in an automobile, the instructions may take the form of audio instructions that are provided along the way as the end-user is traveling the route. Some navigation application programs are able to show detailed maps on computer displays outlining routes to destinations, the types of maneuvers to be taken at various locations along the routes, locations of certain types of features, and so on.

In order to provide these and other navigating functions, the navigation application program uses one or more detailed databases that include data which represent physical features in a geographic region. The detailed database may include data representing the roads and intersections in a geographic region and also may include information about the roads and intersections in a geographic region, such as turn restrictions at intersections, speed limits along the roads, street names of the various roads, address ranges along the various roads, and so on.

One difficulty in providing geographic data for use by a navigation application program relates to the efficient utilization of the available computer resources of the navigation system on which the navigation application program is run. Computer-based navigation application programs are provided on various platforms including some with relatively limited computer hardware resources. For example, navigation systems may be located in vehicles or may be hand-held. These types of navigation systems typically have relatively limited computer resources, such as limited memory and relatively slow I/O In order to provide a high a level of functionality in such systems, it is required that the available computer resources be used efficiently.

Given the relatively large size of the geographic database necessary to provide a desired level of navigating functionality to the end-user, it is accepted that all the data records for an entire geographic region cannot be loaded into the memory of the navigation system at the same time. This is especially true for navigation system platforms with limited resources, such as systems installed in vehicles or hand-held systems. Due to the limited memory resources of these navigation systems, it is necessary to load geographic data as needed from a storage medium, such as a CD-ROM disk, into the memory of the navigation system for use by the navigation application program. Unfortunately, as mentioned above, in these types of systems, I/O access from a storage medium may also be relatively slow. Thus, the relatively limited memory resources combined with the relatively slow I/O can limit the performance of some types of navigation systems, resulting in slow response. Aside from being undesirable, slow response in a navigation system may render the system useless for its intended purpose in certain circumstances. For example, if the navigation system is installed in a vehicle, the driver may require information from the navigation system about a desired route in a matter of seconds in order to utilize the information while driving. If the navigation system requires more than several seconds to calculate a route, the driver may have moved beyond the point at which the routing information provided by the navigation system is relevant. Therefore, it is important that navigation systems operate efficiently in order to provide navigating information relatively quickly.

Navigation application programs may also be run on computer platforms that have in general greater memory resources and faster I/O, such as personal computers or networks. Although these systems may have more and faster resources, the considerations related to the efficient use of geographic data still apply, but on a larger scale. With these types of systems, even greater functionality can be provided if the limitations imposed by memory size and I/O are minimized.

Techniques have been devised or implemented to improve navigation system performance by organizing, structuring, or arranging the geographic database or the data in the database in particular ways. Because a navigation system uses geographic data in certain known and expected ways to perform known functions, the geographic data can be organized, structured, or arranged in a manner that facilitates their use in these known ways by the navigation system.

One technique that can be implemented in a geographic database to enhance operation of the navigation system is to provide separate collections or subsets of the geographic data for use by each of the separate functions in the navigation application program. For instance, the route calculation function normally uses only a portion of all the information in the geographic database that is associated with a segment of a road. When the route calculation function is being run, it may require information such as the speed along a road segment, turn restrictions from one road segment to another, and so on. However, the route calculation function does not necessarily require the name of the road to calculate a route. Similarly, when using the map display function, some of the information associated with a road segment, such as the speed limits or turn restrictions, is not required. Instead, when the map display function is run, it uses only a portion of the information associated with the road segment, such as the shapes and locations of roads, and possibly the names of the roads. Even further, when the route guidance function is being run, some of the information associated with a segment of a road, such as the speed and turn restrictions, is not required. Instead, when the route guidance function is being run, it uses information that includes the name of the road represented by the road segment record, the address range along the road segment, any signs along the road segment, and so on. Although there may be some overlap as to the types of information used by the various navigation functions, some of the data used by any one of these navigation functions is not used by another of the functions. If all the information relating to each road segment were associated with a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

In order to provide the information in the geographic database in a format more efficient for use by each of the navigation functions, separate subsets of the entire geographic database for a given geographic region are provided for each of the different types of navigation functions to be provided in the navigation application program. Each of these separate subsets is tailored specifically for use by one of the functions. Each subset of data includes only the data required to be used by a particular navigation function. There is some overlap of data between each of these subsets, with the result that some parts of the information may be included in more than one subset. For example, both the road segment data entity in the routing data subset as well as the road segment data entity in the cartographic data subset may include attributes identifying the nodes located at the ends of the segments. Although this duplication may result in a larger overall data storage requirement, each of the navigation functions benefits from the resultant efficiency of handling smaller amounts of data.

Providing for separate subsets of geographic data for each of the navigation functions also takes into account that usage of each of these navigation functions relates to the others of the navigating functions in expected ways. For example, an end-user may first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, after an end-user obtains a calculated route, it may be desired to display a map on a computer display with the calculated route highlighted. In order to accomplish this, the routing subset of geographic data is accessed first to obtain the routing road segment data entities for the optimum route, and then the cartographic subset of the geographic database is accessed to obtain the cartographic road segment data entities corresponding to the routing data entities. To permit these data subsets to work together, index files cross reference files, search trees, or other techniques may be used. Although these techniques enable using these different types of data together, there may be delays associated with switching between these types. Accordingly, there continues to be room for improvement in providing a geographic database for use with a navigation application.

SUMMARY OF THE INVENTION

To address the above concerns, according to one aspect of the present invention, there is provided a geographic database for use with a navigation application program that provides navigation features to an end-user. The geographic database includes a plurality of data records of a first type and a plurality of data records of a second type. The plurality of records of the first type are organized into a plurality of parcels, each of which includes a plurality of data records of the first type. The plurality of records of the second type are organized into a plurality of parcels, each of which includes a plurality of data records of the second type. The parcels of data records of the first type are interleaved with the parcels of data records of the second type. This interleaving enables navigation functions that use these different types to access these different types more quickly and efficiently, thereby enhancing navigation system performance.

Also disclosed is a method for forming a geographic database that includes a plurality of data records that represent geographic features and which can be used in a navigation system. The method includes the step of interleaving parcels containing pluralities of data records of a first type with parcels containing pluralities of data records of a second type.

The data types that can be interleaved can be any types, such as routing data, cartographic data, maneuvering data, point of interest data, and so on. The kind of interleaving can be selected to facilitate the performance of certain navigation functions. The kinds of interleaving include single alternating order, spatial ordering, and custom ordering, as well as other kinds.

BRIEF DESCRIPTION OF THE DRAWINGS

FIG. 16 is a diagram illustrating inclusion of aggregated segment records in a parcels of a layer of routing data according to an alternative embodiment.

DETAILED DESCRIPTION OF THE PRESENTLY PREFERRED EMBODIMENTS

I. NAVIGATION SYSTEM—OVERVIEW

Figure 1:
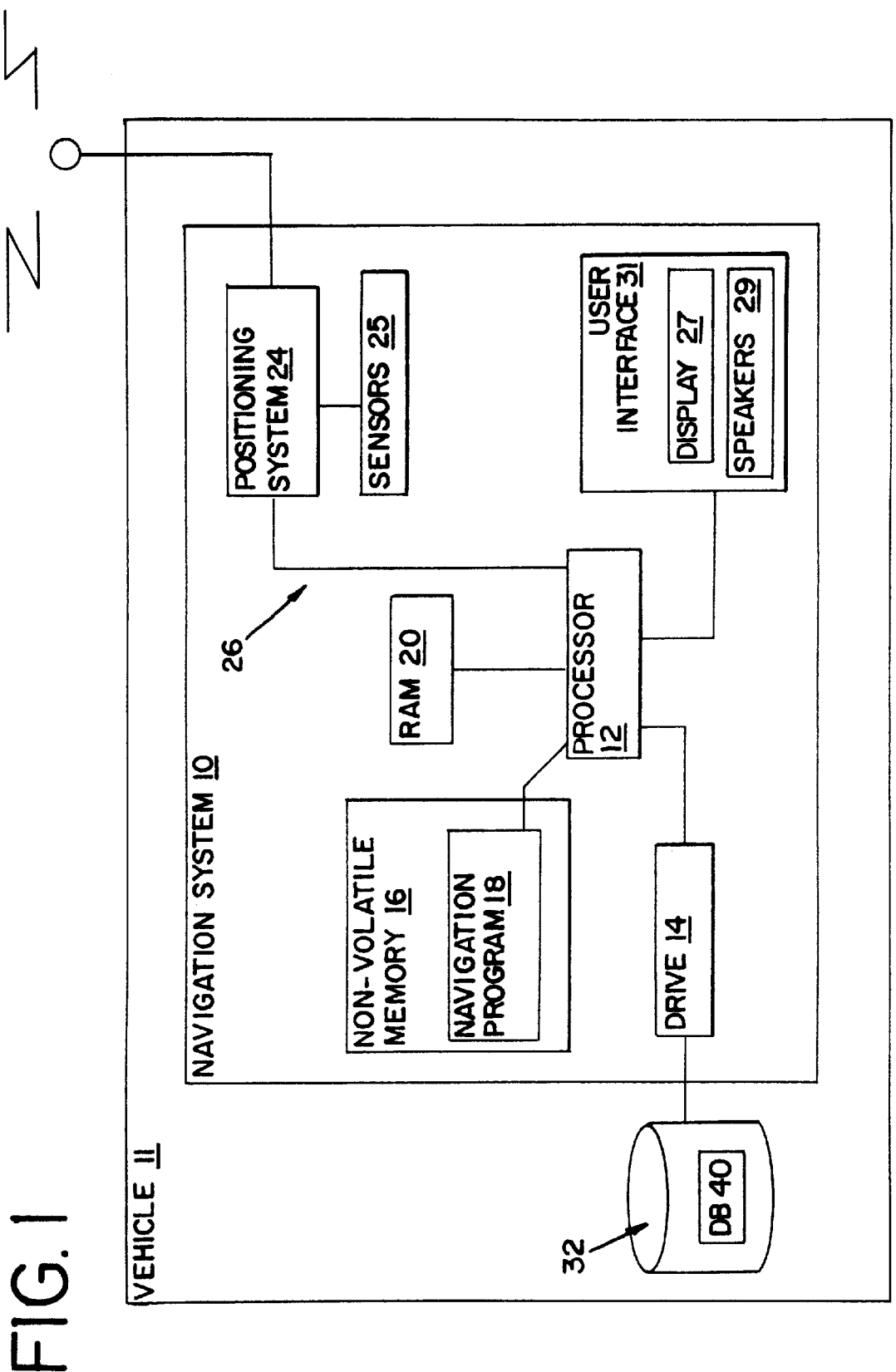
FIG. 1 is a block diagram illustrating a navigation system.

Referring to FIG. 1, there is a block diagram of a navigation system 10. The navigation system 10 is installed in a vehicle 11, such as a car or truck, although in alternative embodiments, the navigation system 10 may be located outside of a vehicle or may be implemented in various other platforms or environments, as described below.

Referring to the embodiment illustrated in FIG. 1, the navigation system 10 is a combination of hardware and software components. In one embodiment, the navigation system 10 includes a processor 12, a drive 14 connected to the processor 12, and a non-volatile memory storage device 16 for storing a navigation application software program 18, possibly as well as other information. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, may also be suitable.

The navigation system 10 may also include a positioning system 24. The positioning system 24 may utilize GPS-type technology, a dead reckoning-type system, or combinations of these, or other systems, all of which are known in the art. The positioning system 24 may include suitable sensing devices 25 that measure the traveling distance speed, direction, and so on, of the vehicle. The positioning system 24 may also include appropriate technology to obtain a GPS signal, in a manner which is known in the art. The positioning system 24 outputs a signal 26 to the processor 12. The signal 26 may be used by the navigation application software 18 that is run on the processor 12 to determine the location, direction, speed, etc., of the navigation system 10.

The navigation system 10 also includes a user interface 31. The user interface 31 includes appropriate equipment that allows the end-user to input information into the navigation system. This input information may include a request to use the navigation features of the navigation system. For example, the input information may include a request for a route to a desired destination. The input information may also include other kinds of information. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display 27, speakers 29, or other means.

The navigation system 10 uses a map database 40 stored on a storage medium 32. The storage medium 32 is installed in the drive 14 so that the map database 40 can be read and used by the navigation system. The storage medium 32 may be removable and replaceable so that a storage medium with an appropriate map database for the geographic region in which the vehicle is traveling can be used. In addition, the storage medium 32 may be replaceable so that the map database 40 on it can be updated easily. In one embodiment, the geographic data may be published by Navigation Technologies of Sunnyvale, Calif.

In one embodiment, the storage medium 32 is a CD-ROM disk. In an alternative embodiment, the storage medium 32 may be a PCMCIA card in which case the drive 14 would be substituted with a PCMCIA slot. Various other storage media may be used, including fixed or hard disks, DVD (digital video disks) or other currently available storage media, as well as storage media that may be developed in the future. The storage medium 32 and the geographic database 40 do not have to be physically provided at the location of the navigation system. In alternative embodiments, the storage medium 32, upon which some or all of the geographic data 40 are stored, may be located remotely from the rest of the navigation system and portions of the geographic data provided via a communications link, as needed.

The navigation application software program 18 is loaded from the non-volatile memory 16 into a RAM 20 associated with the processor 12 in order to operate the navigation system. The navigation system 10 uses the map database 40 stored on the storage medium 32, possibly in conjunction with the output 26 from the positioning system 24, to provide various navigation features and functions. The navigation application software program 18 may include separate applications (or subprograms) that provide these various navigation features and functions. These functions and features may include route calculation, map display, vehicle positioning (e.g., map matching), route guidance (wherein detailed directions are provided for reaching a desired destination), destination resolution capabilities, and other functions.

II. GEOGRAPHIC MAP DATABASE a. Overview.

In one present embodiment, the speed and/or functionality of a navigation system can be enhanced by a combination that includes improvements in the storage, arrangement, and/or structuring of the geographic data used by the system to facilitate the use of the data by some of the functions in the navigation application program in the systems that use the data. Based upon the manner in which the geographic data are stored, arranged, and/or structured, functions in the navigation application program that access and use the data can implement routines that exploit the improvements incorporated into the geographic data. This combination can result in overall improved performance by the navigation system.

The map database 40 contains information about the roadway network in the geographic region. In one embodiment, the map database 40 includes node data and segment data. Node data represent physical locations in the geographic region (such as roadway intersections and other positions) and segment data represent portions of roadways between the physical locations represented by nodes. Each road segment in the geographic region is represented by a road segment data entity (i.e., a record) in the map database 40. Each road segment data record in the map database has two nodes which represent the coordinate positions at each end of the road segment represented by the road segment data record. The information included in the node and segment data entities is explained with reference to FIGS. 2 and 3. (The terms "nodes" and "segments" represent only one terminology for describing these physical geographic features and other terminology for these features is intended to be encompassed within the scope of these concepts.)

Figure 2:
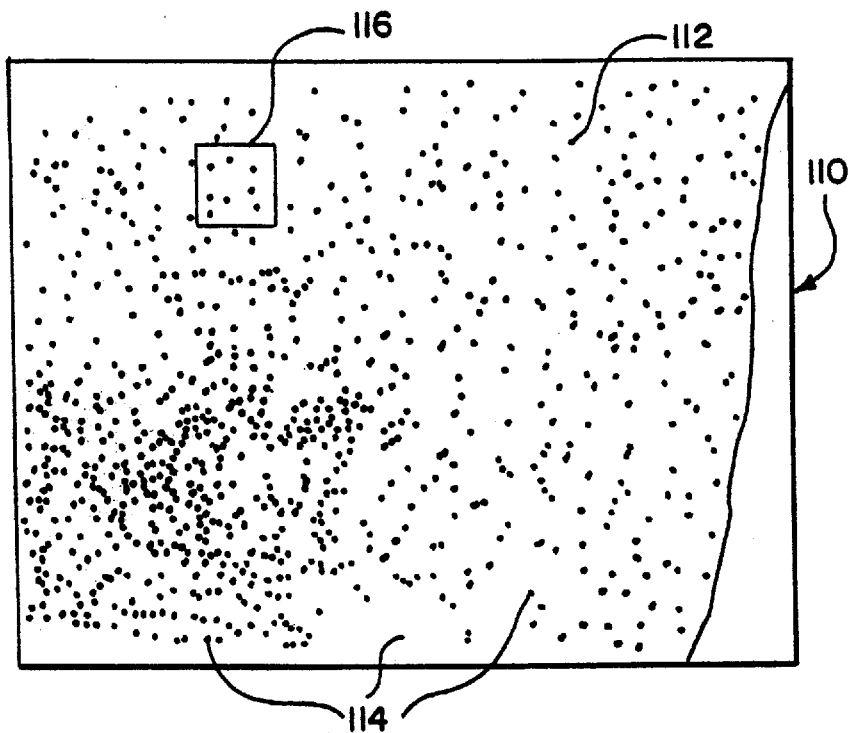
FIG. 2 illustrates a map showing a geographic region represented by the geographic database of FIG. 1.

FIG. 2 illustrates a map 110 showing a geographic region 112. A plurality of locations 114 are shown to be located in the geographic region 112. Each of the locations 114 represents a place or point in the geographic area 112 at which there is located a feature about which it is desired to include information in a geographic database. Each of these locations 114 has a unique physical location (latitude, longitude, and optionally absolute or relative altitude) and each of the locations 114 can be uniquely identified by its two dimensional (or three dimensional) geographic coordinates, (i.e., latitude, longitude, and optionally altitude). A location 114 may correspond to an intersection at which two or more roads meet, a point along a road segment at which the direction of the road changes, a point along a road segment at which the speed limit changes, a point at which a road reaches a dead end, and so on. The location 114 may correspond to a position of a point-of-interest, such as a hotel or civic center, a boundary of a natural feature, such as a lake, or a position along a railroad track or ferry. The locations 114 may correspond to anything physically located in the geographic area 112.

Figure 3:
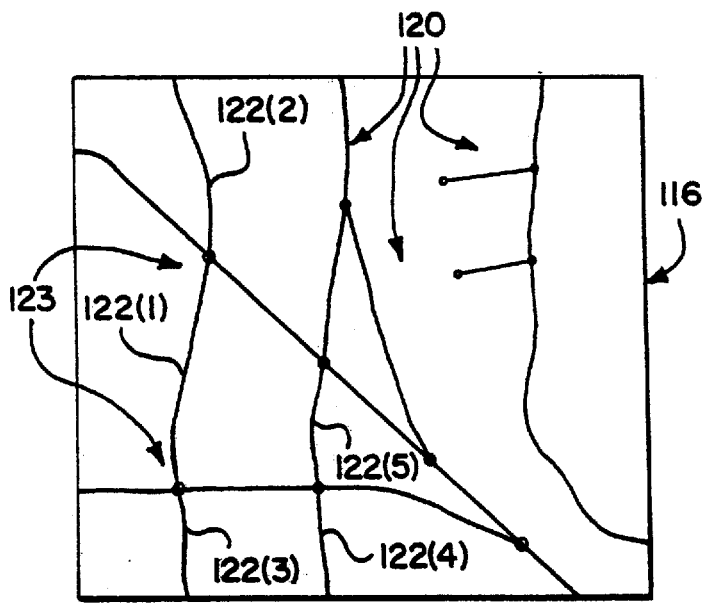
FIG. 3 shows an expanded view of a portion of the map of FIG. 2.
Figure 4:
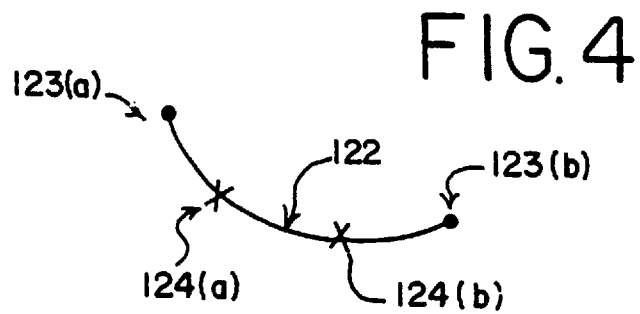
FIG. 4 is an illustration of a single road segment shown in the map of FIG. 3.

FIG. 3 shows an expanded view of a portion 116 of the map 110. The portion 116 in FIG. 3 illustrates part of the road network 120 in the geographic region 112. The road network 120 includes, among other things, roads and intersections located in the geographic region 112. As shown in FIG. 3 in the illustrated portion 116 of the map 110, each road in the geographic region 112 is composed of one or more segments, 122(1), 122(2) . . . 122(n). In one embodiment, a road segment represents a portion of the road. In FIG. 3, each road segment 122 is shown to have associated with it two nodes 123: one node represents the point at one end of the road segment and the other node represents the point at the other end of the road segment. A single road segment 122 and its two associated nodes 123(a) and 123(b) are illustrated in FIG. 4. The node at either end of a road segment may correspond to a location at which the road meets another road, e.g., an intersection, or where the road dead ends. (An intersection may not necessarily be a place at which a turn from one road to another is permitted, but represents a location at which one road and another road have the same latitude and longitude.)

In addition, if the road segment 122 is other than straight (e.g., it bends, turns, etc.), the road segment 122 may include one or more shape points 124 between its end points 123. Shape points 124 provide geographic positions (i.e., latitudes, longitudes, and optionally, altitudes) along the length of the road segment to accurately represent the true physical locations of the road segment along its length. Shape points 124 are used to assist in vehicle positioning, map display, etc.

In one type of geographic database, there is at least one database entry (also referred to as "entity" or "record" for each road segment represented in a geographic region. This road segment data record may have associated with it information (such as "attributes", "fields", etc.) that allows identification of the nodes associated with the road segment and/or the geographic positions (e.g. the latitude and longitude coordinates) of the two nodes. In addition, the road segment record may have associated with it information (e.g., more "attributes", "fields", etc.), that specify the speed of travel on the portion of the roadway represented by the road segment record, the direction of travel permitted on the road portion represented by the road segment record, what if any turn restrictions exist at each of the nodes which correspond to intersections at the ends of the road portion represented by the road segment record, the street address ranges of the roadway portion represented by the road segment record, the name of the road, and so on. Each segment data entity that represents an other-than-straight road segment may include one or more shape point data attributes that define the other-than-straight shape of the road segment. The various attributes associated with a road segment may be included in a single road segment record, or preferably are included in more than one type of road segment record which are cross-referenced to each other.

In a geographic database that represents the region 112, there may also be a database entry (entity or record) for each node in the geographic region. The node data record may have associated with it information (such as "attributes", "fields", etc.) that allows identification of the road segment (s) that connect to it and/or its geographic position (e.g., its latitude and longitude coordinates).

b. Separate subsets of geographic data

One way that the accessing of geographic data can be enhanced for performing various navigation functions is to provide separate collections or subsets of the geographic data for use by each of the separate functions in the navigation application program. Each of these separate subsets is tailored specifically for use by one of the functions. For instance, the route calculation function normally uses only a portion of all the information in the geographic database that is associated with a segment of a road. When the route calculation function is being run, it may require information such as the speed along a road segment, turn restrictions from one road segment to another, and so on. However, the route calculation function does not necessarily require the name of the road to calculate a route. Similarly, when using the map display function, some of the information associated with a road segment, such as the speed limits or turn restrictions, is not required. Instead, when the map display function is run, it uses only a portion of the information associated with the road segment, such as the shapes and locations of roads, and possibly the names of the roads. Even further, when the route guidance function is being run, some of the information associated with a segment of a road, such as the speed and turn restrictions, is not required. Instead, when the route guidance function is being run, it uses information that includes the name of the road represented by the road segment, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

Figure 5:
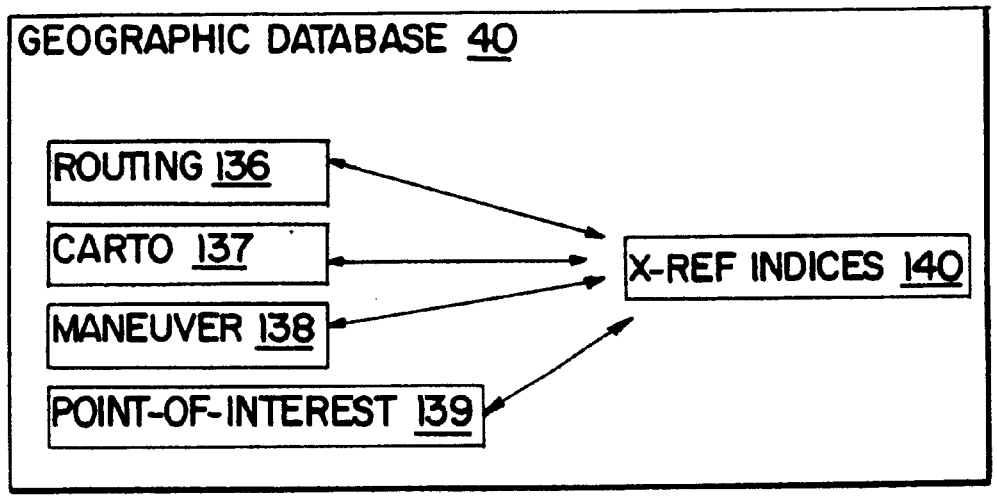
FIG. 5 is a diagram illustrating the different types of data included in the geographic database of FIG. 1 for use with various navigation application functions.

In order to provide the information in the geographic database in a format more efficient for use by each of the navigation functions, separate subsets of the entire geographic database for a given geographic region are provided for each of the different types of navigation functions to be provided in the navigation application program. FIG. 5 illustrates the geographic database 40 comprised of separate routing data 136, cartographic data 137 (for map display), maneuver data 138 (for route guidance), and point-of-interest data 139. A geographic database may be defined with fewer or more subsets than these, and other types of data may be defined and included.

Each subset of data includes only the data required to be used by a particular navigation function. There is some overlap of data between each of these subsets, with the result that some parts of the information may be included in more than one subset. For example, both the road segment data entity in the routing data subset as well as the road segment data entity in the cartographic data subset may include attributes identifying the nodes located at the ends of the segments. Although this duplication may result in a larger overall data storage requirement, each of the navigation functions benefits from the resultant efficiency of handling smaller amounts of data.

Providing for separate subsets of geographic data for each of the navigation functions also takes into account that usage of each of these navigation functions relates to the others of the navigating functions in expected ways. For example, an end-user may first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, in the example mentioned above, after a user obtains a calculated route, it may be desired to display a map on a computer display with the calculated route highlighted. In order to accomplish this, the routing subset 136 of geographic data is accessed first to obtain the routing road segment data entities for the optimum route, and then the cartographic subset 137 of the geographic database is accessed to obtain the cartographic road segment data entities corresponding to the routing data entities. To permit these data subsets to work together, index files 140 may be included that provide cross references, search trees, or other data finding techniques.

c. Layering of geographic data

Another way that the geographic data can be organized to enhance their use is to provide the data in layers. Some of the navigation functions, such as the map display function and the route calculation functions, may use data at different levels of detail. For example, when using the map display function, it is sometimes desired to provide for panning and zooming. Zooming can be done more efficiently if the data are organized into layers, with greater detail at the lower layers and less detail at the higher layers. When using the route calculation function, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments, to be investigated when calculating the route. Therefore, within some of the subsets of data types, the geographic data are provided in separate collections or groups corresponding to separate layers.

To implement layering, each road segment data record in the map database 40 also identifies the rank of the corresponding portion of the roadway that it represents. A rank of a road segment may correspond to its functional class. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.

The rank of a road segment data entity also specifies the highest data layer in which a road segment entity is included. For example, referring to FIG. 6, the routing type data 136 may include five separate layers of the data, R0, R1, R2, R3, and R4, each comprising a separate collection of the routing data with a different level of detail, which can be used by the route calculation function. In the routing data type of the geographic database, layer 0 ("R0") includes the road segment data entities (and some or all of their corresponding routing data attributes) having a rank of "0" or higher. Thus, layer 0 includes road segment data entities corresponding to all the portions of all the roads in the geographic region. Layer 1 of the routing data 137 comprises a separate subset (or collection) of the routing data and includes only the routing segment data entities (and some or all of their corresponding routing data attributes) having a rank of "1" or higher. Layer 2 of the routing data comprises a separate subset of the routing data and includes only the routing segment data entities (and some or all of their corresponding navigation data attributes) having a rank of level 2 or higher, and so on. A highest layer (layer n) includes only records having a rank of n. In a present embodiment, n is equal to 4, although in other embodiments, n may be any number greater than 0. Each higher layer includes fewer records, however these records represent roads upon which travel is generally faster.

Similarly, the other types of data, such as the cartographic subset type 137 may include separate collections of the data, each with a different level of detail, which can be used by the map display function. Using these different layers of cartographic data, the map display function can provide rapid panning and zooming.

Although the organization of some of the data into layers results in some duplication of the data, the increased efficiency provided by layering generally offsets any disadvantages. As with the use of separate types of data mentioned above, the need arises to allow these layers to work together. The index files 140, which include cross references, search trees, or other finding techniques, may be provided for this purpose.

d. Spatial access to geographic data

Organizing the data into subsets or types and layering the data of some of the types provide separate collections of the data in sizes that are more manageable by each of the navigation functions. With respect to some subset types and layers of these types, the data can be further organized to facilitate spatial access.

Several of the navigation functions provided in a navigation system may require access to the geographic data spatially. One way this arises is that a function in a navigation application program requires finding a data entity record in a geographic database given the physical location represented by the data entity in the geographic region. The data entity may be a road segment record that represents a portion of a road in the geographic region and the function may require finding the road segment record based upon the physical location in the geographic region of the portion of the road represented by the road segment record. Another way spatial access arises is when a function in a navigation application program requires finding several or all of a type of data records located close to a location in the geographic region or within a defined area in the geographic region. For example, a function may require all road segment records that represent road segments encompassed within a rectangle defined by geographical coordinates (x, x+n) latitude and (y, y+m) longitude.

Assuming that all the data records for a given entire geographic region cannot be loaded into memory at the same time due to limited memory resources of the navigation system in which the navigation application program is being run, it would be desirable to load into memory only those data that are needed. Since some of the navigation functions require accessing data spatially, it would be advantageous to provide a means to load data into memory based generally upon the physical geographic locations of the features which the data represent or upon the geographical proximity of the features which the data represent. This can be provided by organizing the data so that they are located in the database and/or on the medium based upon the geographic locations of the features which are represented by the data. Various techniques can be used to provide for spatial access. One kind of technique, parcelization, is described below.

e. Parcelization.

Parcelization is included among the techniques that can be used to facilitate the use of geographic data by navigation systems. Assuming that all the data records for a given entire geographic region cannot be loaded into the memory of the navigation system at the same time, due to limited memory resources of the navigation system in which the navigation application program is being run, it would be desirable to load into memory only those data that are needed to perform a desired function. In order to accomplish this, data in the geographic database 40 are organized in a manner that minimizes the number of times that the medium must be accessed and read in order to perform a navigation function. To provide for this, the data are organized into parcels. When data are parcelized, the plurality of data records that together comprise the geographic data are grouped together into separate groups or parcels. A parcel of data is established to contain data that are always accessed together. This may relate to the quantity of data that can be accessed in a single disk access, although it may be related to some other factor. For some types of media such as a CD-ROM disk, a parcel may be established to be a 16 Kilobyte quantity of data. (Other sizes of data may be used including 1 K, 2 K, 4 K, 8 K, 32 K, and so on. The portions of the geographic database are generally formed in sizes of $2^n$ Kilobytes, wherein n is an integer value greater than 1.)

Parcelization can be used in conjunction with spatial access to facilitate the use of data to enhance performance of the navigation system. When geographic data are organized spatially, features that are close together physically in the geographic region are represented by data records that are physically (or logically) close together in the database. Geographic data can be both parcelized and spatially organized to take advantage of both these techniques.

For purposes of forming the data into parcels, the data may be first separately organized into different types, such as routing 136, cartographic 137, maneuver 138, points of interest 139, and so on. Some of these kinds of data may be parcelized spatially in order to facilitate use of the data by the navigation functions and others of these kinds of data may not be parcelized spatially. Spatially-parcelized data are arranged so that the data that represent geographically proximate features are located logically and/or physically proximate in the database 40 and/or on the medium 32. For some of the navigation application functions, spatial parcelization of their respective data provides for reading closely related geographic data from the medium more quickly and loading related geographic data into memory where they can be used. This kind of organization minimizes accessing of the storage medium 32 and may speed up operation of these navigation functions. The routing data 136 (in FIG. 5) are included among the kinds of data that may be spatially organized.

There are a number of different procedures that can be used for parcelizing spatially organized geographic data. For example, a simple parcelization method may provide for separating the geographic data into a plurality of parcels or groupings wherein the data in each parcel represent features encompassed within a separate one of a plurality of regular sized rectangles which together form a regular, rectangular grid over the geographic region. Another method for parcelization is to separate the data into parcels encompassed within rectangular areas where each of the rectangles is formed by a bisection of rectangles encompassing parts of the region until a parcel size below a maximum threshold is obtained. In addition, parcelization procedures are disclosed in the copending application Ser. No. 08/740,295, filed Oct. 25, 1996, the entire disclosure of which is incorporated by reference herein, and parcelization procedures are also described in the copending patent application Ser. No. 08/935,809, filed Sept. 5, 1997, the entire disclosure of which is incorporated by reference herein. Still another method of parcelization to which the disclosed subject matter can be applied is described in U.S. Pat. No. 4,888, 698.

Figure 7:
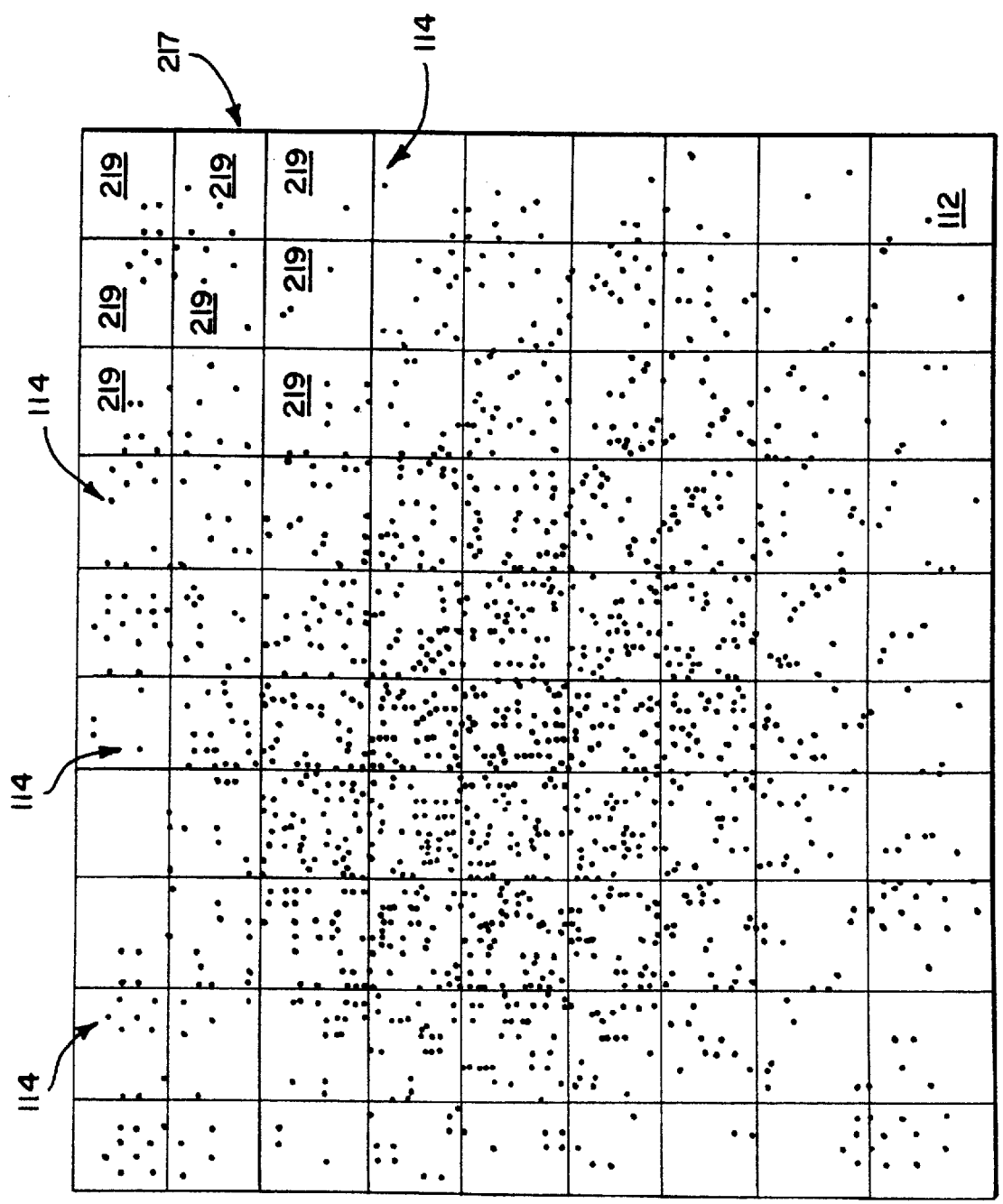
FIG. 7 shows a map of the geographic region of FIG. 2 illustrating application of a parcelization method to spatially organized geographic data.
Figure 8:
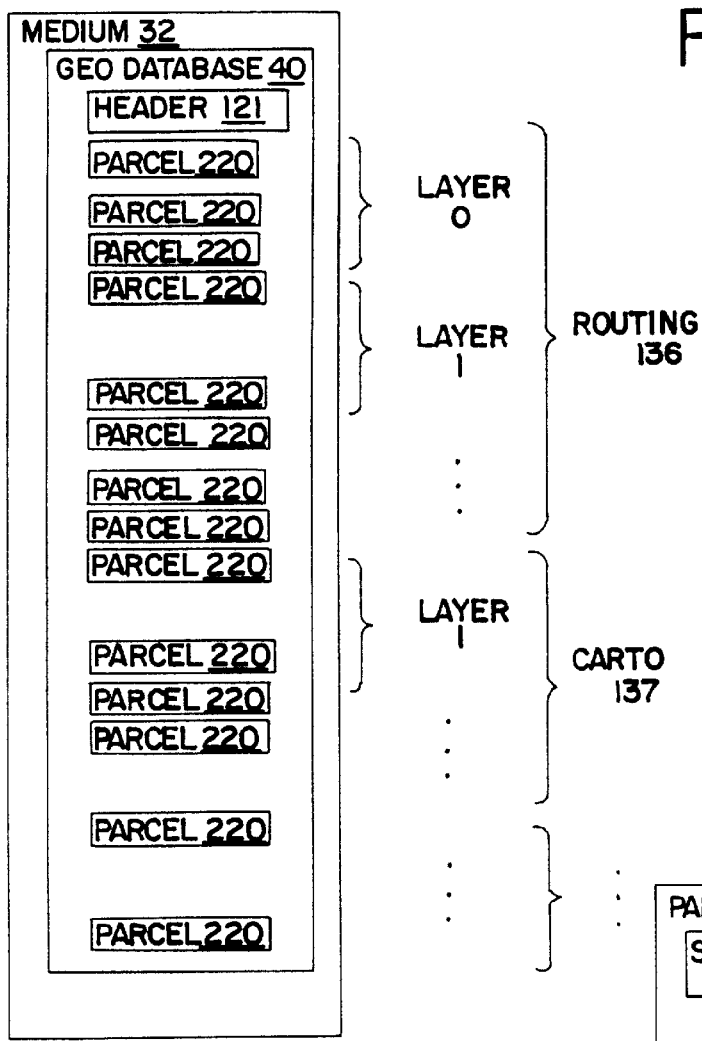
FIG. 8 is a diagram showing the arrangement of parcels of data in the geographic database of FIG. 1 according to the parcelization method illustrated in FIG. 7.
Figure 9:
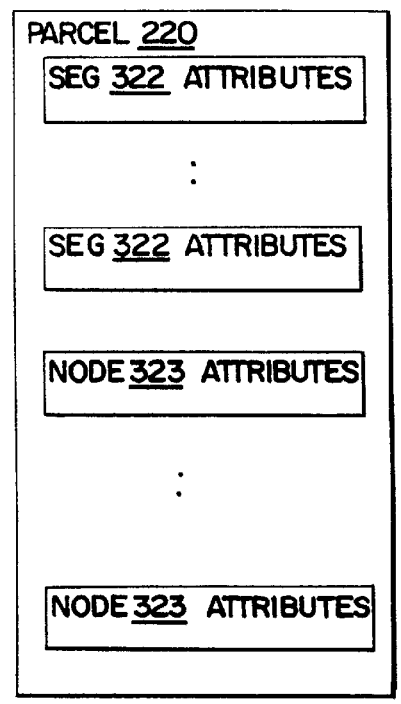
FIG. 9 is a diagram showing the arrangement of segment and node data records within a single parcel of the database of FIG. 8.

Parcelization of spatially organized data is illustrated with reference to FIGS. 7–9. FIG. 7 shows the map 110 of the geographic region 112, previously illustrated in FIG. 2. The plurality of positions 114 (represented by the dots or points) are shown to be located on the map 110. In FIG. 7, a grid 217 overlays the geographic region 112 represented by the map 110. The grid 217 divides the geographic region 112 into a plurality of rectangular areas 219. The grid lines of the grid 217 represent the boundaries of rectangular areas 219. These rectangular areas 219 may be all the same size or may have different sizes depending upon the procedure used for parcelization. Likewise, the locations of the boundaries may depend on the parcelization procedure used. In general, when using any of the procedures for spatial parcelization, the data records of a particular type of data which represent features that are encompassed within each rectangular area 219 are grouped together in a separate parcel of data. Referring to FIGS. 8 and 9, the plurality of data records, such as the road segment records 322 and the node records 323 that comprise the geographic database 40, are collected into separate groupings called parcels 220. With respect to the spatially organized data, each parcel 220 in FIGS. 8 and 9 includes one or more data records 322, 323, which represent the geographic features encompassed within a separate one of the plurality of rectangles 219 shown in FIG. 7.

As shown in FIGS. 8 and 9, the parcels 220 are stored to form the database 40 so that the data in each parcel 220 are logically and/or physically grouped together. A parcel 220 may represent the physical quantity of data that can be accessed at a time by the navigation system. When a parcel of data is accessed, all of its data records 322, 323, are read from the medium into the memory of the navigation system at the same time. With reference to the map 110 of FIG. 7, this means that all the data records, such as the segment records 322 or node records 323, of a spatially organized type of data encompassed within each rectangle 219 are accessed together as a group. It can be appreciated that for certain kinds of navigation functions, it is desirable to have in memory at the same time all the data records that represent features that are physically close together in the geographic region.

As the parcels 220 are formed for these types of data, the parcels are ordered. Various types of ordering may be used. In general, it is preferred that the parcels be ordered in a manner that minimizes searches for data. One way to order spatially organized parcels is to use a depth-first ordering from a kd-tree index within each type of data. This provides an ordering similar to Peano-key ordering. Parcels may be stored on disk (i.e., medium 32 in FIG. 1) in this approximate Peano-key order. One or more indices, such a kd-tree, can be used to access parcels spatially. This index is useful for initial location of an arbitrary position, such as when a program in a navigation system initially locates the map data corresponding to a current vehicle position. As the parcels 220 are ordered, each may also be assigned a unique parcel identifier (e.g., a "parcel ID". The parcel ID may be used to identify the parcel and/or its location on the medium.

(As mentioned above, some kinds of data are not spatially organized. Each parcel of non-spatially organized data does not necessarily correspond to any of the rectangular areas 219 in FIG. 7. For example, data that represents the names of streets may be organized alphabetically instead of spatially.)

III. SEGMENT AGGREGATION a. Overview.

In a present embodiment, the geographic database includes data records that represent aggregations of road segments. These data records that represent aggregations of segments of roads are included in the database in addition to the data records (e.g., 322 in FIG. 9) that represent the separate road segments from which the aggregations are formed. Using data records that represent aggregations of roads has the potential to provide several advantages. Using records that represent aggregations of segments of roads may reduce the number of road segments that need to be explored during route calculation. It is also possible that if records that represent road segment aggregations are used, the number of segments that make up a final calculated route may be reduced thereby improving navigation system performance. In addition, it is also possible that if records that represent road segment aggregations are used, the overall size of the database may be reduced.

One way to form data records that represent aggregations of segments of roads derives from the formation of multiple layers of data in the database. As mentioned above, a road segment data entity includes a rank attribute that corresponds to a functional classification of the represented road segment. In a present embodiment, the rank attribute is used to form layers of the geographic database. The rank attribute specifies the highest data layer in which the road segment is represented. The lowest layer, i.e., "R0", of the route calculation data 136 includes all routing road segment records (i.e., road segment records of all ranks). In each succeeding higher layer, the lowest-ranked road segment records are omitted. As a result, these higher layers include a number of "bivalent" nodes, i.e. nodes between at which exactly two segments meet or intersect. (It is also possible to form bivalent nodes under other circumstances in the geographic database, for example when a road segment crosses an administrative boundary.) If attributes that are relevant to route calculation are the same for the two road segment records that are joined by a bivalent node, an aggregated segment record can be formed that suppresses or drops the bivalent node.

b. Physical representation of aggregated segments.

Figure 10A:
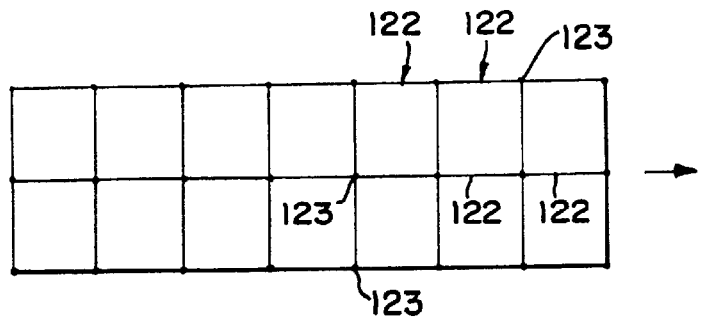
FIGS. 10A through 10D graphically illustrate the geographic features represented by aggregated segment data records.
Figure 10B:
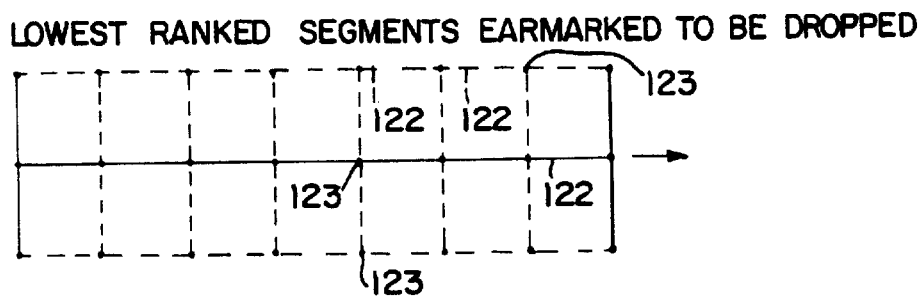
Figure 10C:
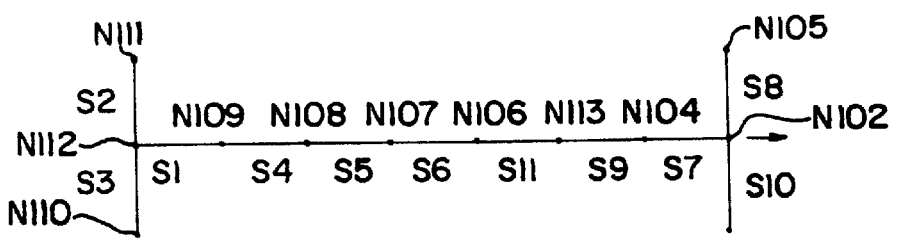
Figure 10D:
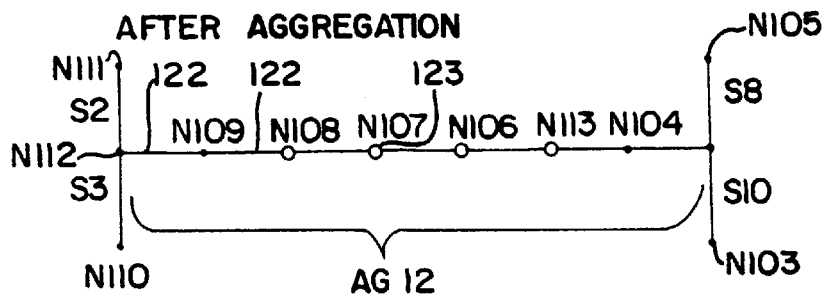

FIG. 10A is an illustration of a plurality of road segments 122 which are represented by road segment records in layer 0 of the routing data 136. A node 123 is associated with each of the end points of each of the road segments 122. In layer 0, all the road segments of all the ranks are represented by data entities. FIG. 10B shows the same plurality of segments 122 and nodes 123 shown in FIG. 10B, except that the road segments having a rank of "0" are illustrated in dashed lines. FIG. 10C shows these lower ranked road segments removed. (FIGS. 10B and 10C illustrate intermediate stages and are not representative of a layer.) FIG. 10C illustrates the segments 122 and nodes 123 in layer 1. As illustrated in FIG. 10C, elimination of road segments having a rank of 0 results in some remaining nodes joining only two road segments. It may be possible to speed up route calculation if little or no calculation is performed when calculating a route that traverses these kinds of nodes. To take advantage of this arrangement, the segments 122 (labeled S1, S4, S5, S6, S7, S9, and S11) are represented by an aggregated segment record which is formed and stored in the geographic database 40. This aggregated segment record represents the aggregation, labeled AG12, of the separate road segments, as shown in FIG. 10D.

C. Aggregation Criteria.

FIGS. 10A–10D illustrate the conditions under which it is possible to form an aggregated segment record. According to one alternative embodiment, aggregated segment records are always formed whenever two and only two road segments are joined by a single node. However, under some circumstances, it may be preferable to refrain from forming an aggregated segment record under these conditions. For example, if certain attributes of adjacent road segments differ, it may be preferable not to form an aggregated segment record to represent them in aggregation even if they are the only road segments joined by single node. Thus, according to an alternative embodiment, attributes of adjacent road segment records are examined to determine whether the represented road segments are similar enough to be represented by an aggregated segment data record. Various criteria may be used for making this determination. For example, in one alternative embodiment, it may be required that all attributes in adjacent road segments be the same in order to form an aggregated segment record. In another alternative embodiment, it may be required that only certain attributes be the same in adjacent road segments to form an aggregated segment record. In this latter alternative, some attributes may be permitted to differ between adjacent road segments.

In one present embodiment, an aggregated segment record is formed where each consecutive pair of adjoining road segments has the same name, rank, speed category, lane category, and access characteristics, among other characteristics. However, formation of an aggregated road segment is not permitted if the adjacent road segments include a restricted driving maneuver, a vehicle restriction; a direction of travel restriction, a gate, a high-occupancy-vehicle restriction, a bifurcated roadway, a toll booth, or signage, among other restrictions.

The above criteria only represent examples of the kinds of attributes that may be evaluated to determine whether an aggregated segment record is formed from two or more adjacent segments. Other criteria may be suitable.

d. Process for forming aggregated segments.

When forming aggregated segment records using any embodiment that requires an evaluation of whether the adjacent road segments meet some criteria, the first step is to identify possible end nodes for aggregated road segments. These may be referred to as "aggregated-segment-significant" nodes. Every node in the geographic database at each of the layers is evaluated to determine whether it is an aggregated-segment-significant node. The nodes are evaluated one at a time, starting at the highest layer and working down. A node is "aggregated-segment-significant" at a given layer when only one road segment, or more than two road segments, are connected to it. However, if exactly two road segments are connected to a node, the node may not be aggregated-segment-significant. gnificant If a node is determined to be aggregated-segment-significant at a given layer, it is aggregated-segment-significant at all lower layers. Each road segment in a layer that has an aggregated-segment-significant node on one end and a non-significant node on the other end is a potential starting end for an aggregated segment.

In FIG. 10C, nodes N102 and N112 are aggregated-segment-significant since they connect to more than two segments. Nodes N104, N106, N107, N108, N109, and N113 may be non-significant since they connect to two and only two segments. Segment S1 is identified as a potential starting point for an aggregated segment since it has one node, N112, that is aggregated-segment-significant, and the other node, N109 that may be non-significant. Unless there is a condition, sign, or some other attribute change on S1, the node N112 can be used as the starting point for an aggregated segment. The node N109 on the other end of segment S1 is evaluated according to the applicable criteria to determine whether it is a significant node. If it is not a significant node, the node N109 is a potential internal node for an aggregated segment. Then, the other segment connected to the node N109, i.e., S4 in FIG. 10C, is evaluated (1) to determine whether its other node, N108, is aggregated-segment-significant, and (2) to check whether the other aggregation criteria are met. This process continues until an aggregated-segment-significant is reached or until a node is reached that would otherwise be non-significant but which connects two segments that have differing conditions that disqualify them from being aggregated. These conditions are described above. If a node which would otherwise be non-significant connects two road segments having differing conditions that disqualify them from being aggregated, the node is denominated as an aggregated-segment-significant node for that rank and lower.

It is noted that the above method produces an aggregated segment that has aggregated-segment-significant nodes at its ends and at least one non-significant node between the ends. However, not all aggregated-segment-significant nodes within a layer are necessarily located at end points of an aggregated segment.

e. Location of aggregated segment records.

Figure 6:
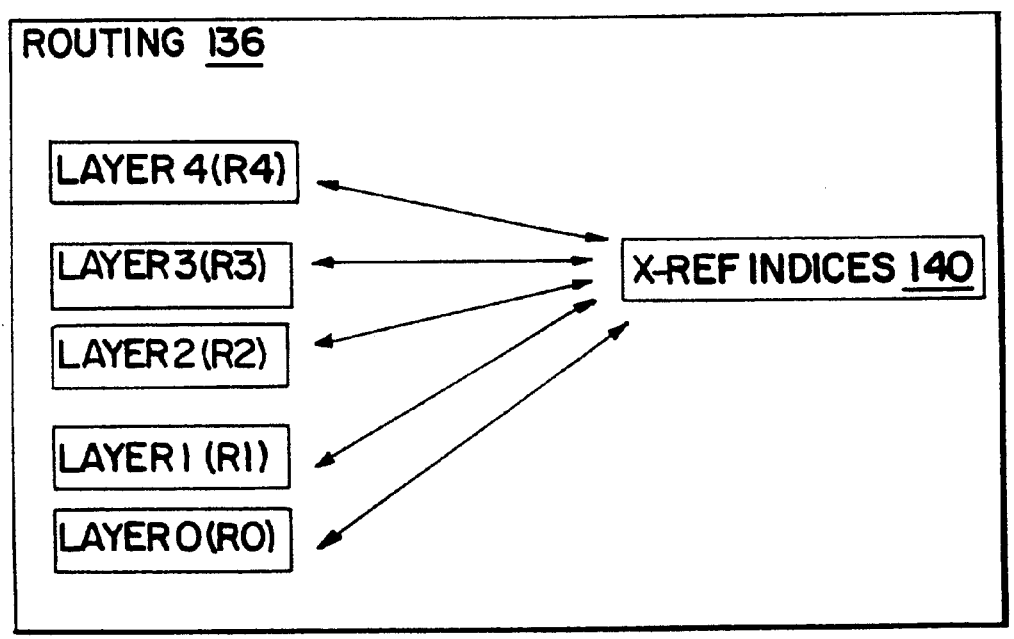
FIG. 6 is a diagram illustrating separate layers of data in the routing data shown in FIG. 5.

Once a string of road segments (between two aggregated-segment-significant nodes) are identified that connect to each other by non-significant nodes, an aggregated segment record is created to represent this aggregation of road segments. In embodiments of geographic databases in which the data are organized by type, the aggregated segment data records may be included among the routing data 136 as shown in FIG. 5. In embodiments of the geographic database in which the data are layered, the aggregated segment data records are found in layers above layer 0 (e.g., layer >0) as shown in FIG. 6. In embodiments of geographic databases in which the data are spatially organized, aggregated segment data records may be included among the spatially organized data, such as in parcels 220 of the data shown in FIG. 8.

Figure 11:
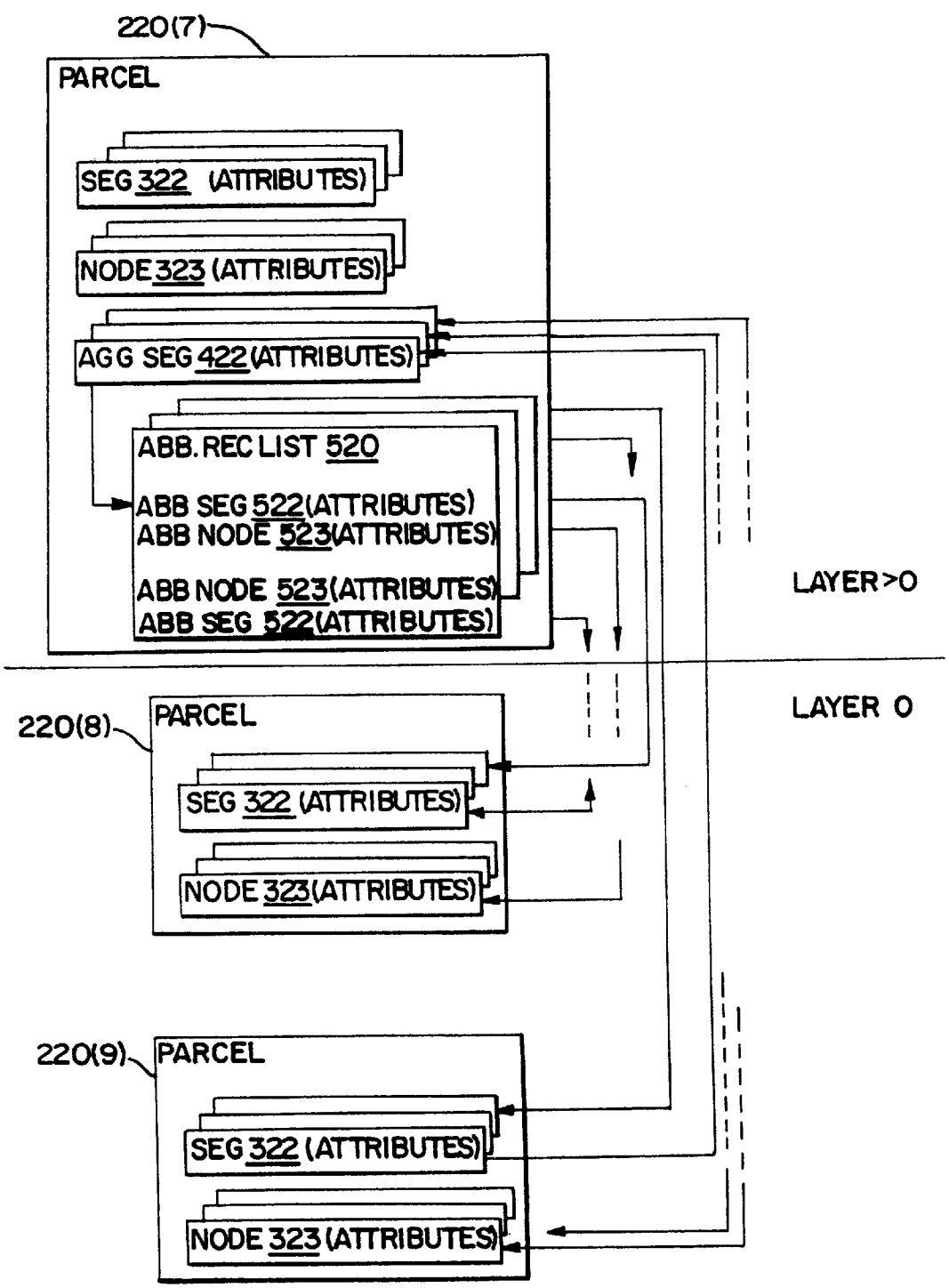
FIG. 11 is a diagram illustrating inclusion of aggregated segment records in a parcel of routing data in layer above layer 0.

FIG. 11 shows aggregated segment data records 422 stored in a parcel 220(7) of routing data 136. The parcel 220(7) is in a layer greater than layer 0. With respect to FIG. 11, the illustrated parcel 220(7) represents only one of a plurality of parcels within the layer >0. Furthermore, it is understood that there may be one or more layers greater than layer 0, each with a plurality of parcels, each including aggregated segment records. In a present embodiment, there are three layers greater than layer 0 (i.e., layers 1, 2, and 3) that include the arrangement of aggregated segment records illustrated in FIG. 11. In alternative embodiments, there may be more or fewer than three layers.

f. The aggregated segment entity.

In one embodiment, the aggregated segment entity or record 422 includes all the same kinds of attribute information that is included in non-aggregated road segment records (such as the road segment records 322 illustrated in FIG. 9). Alternatively, the aggregated segment record 422 may include fewer of the kinds of attribute information that are included in non-aggregated road segment records 322. In one embodiment, each aggregated segment record 422 includes attribute information that corresponds to those features that adjacent road segments are required by the applicable criteria to have in common in order to form the aggregated segment record. The attributes that adjacent segments are not required to have in common may be either combined or dropped in the process of generating a single set of aggregated attributes for the aggregated segment record 422.

Figure 12:
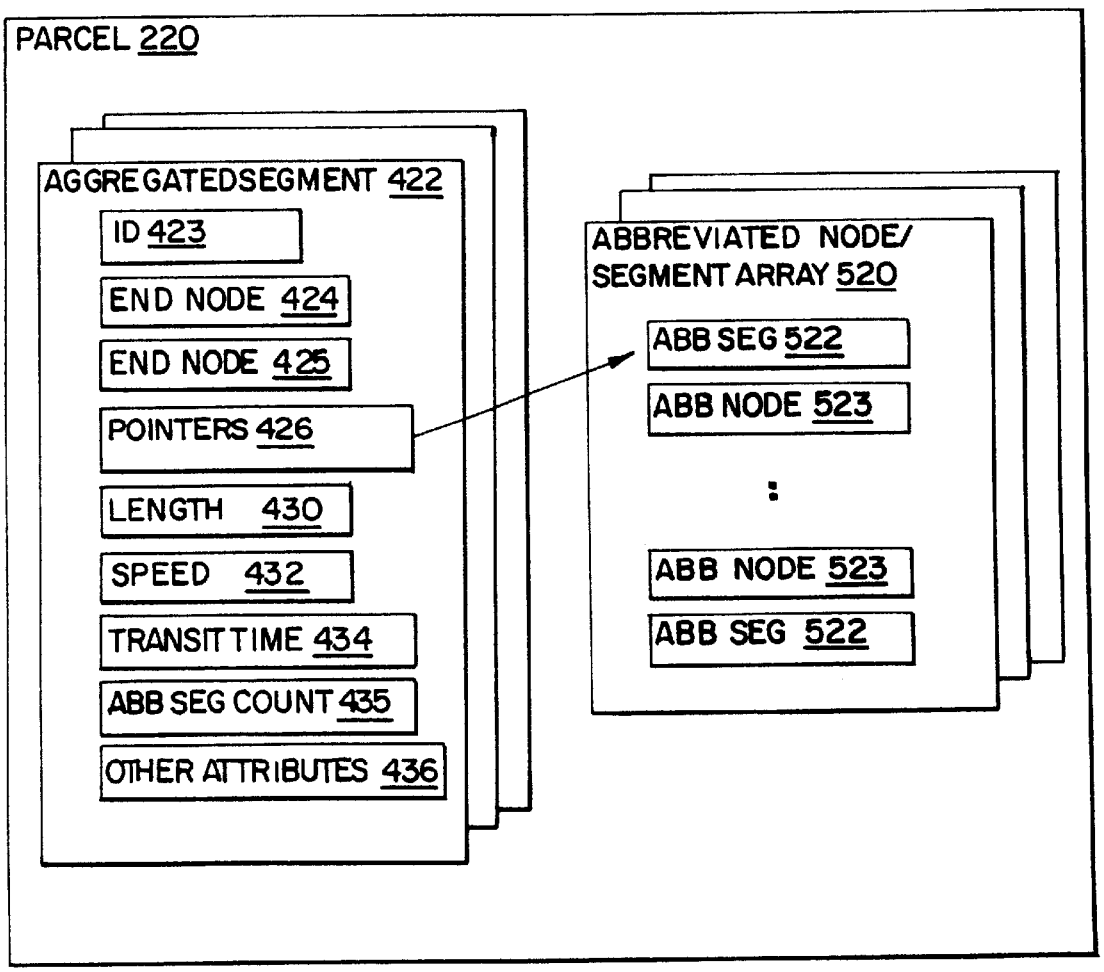
FIG. 12 is a diagram illustrating the components of an aggregated segment record and its associated abbreviated record array of FIG. 11.

The components of an aggregated segment record 422 are shown in FIG. 12. The aggregated segment record 422 includes a segment identifier (e.g., "ID") 423 that identifies it as an aggregated segment. The aggregated segment record 422 includes data that identifies its end nodes 424 and 425 which correspond to the aggregated-segment-significant nodes. (For example, referring to FIG. 10D, it is noted that the aggregated segment AG12 includes nodes N102 and N112 that correspond to the end points of the aggregated segment.) The aggregated segment record 422 may also store information about the aggregated segment that it represents including its length 430, its average speed 432, and a transit time 434. The aggregated segment record 422 may also store additional information 436.

In a present embodiment, the aggregated segment record 422 includes data that can be used to identify the segment records and node records that represent the road segments and nodes between the road segments that in aggregation are represented by the aggregated segment record. The aggregated segment record 422 includes at least one pointer 426 to an array 520 that includes abbreviated segment records 522 and abbreviated node records 523. In a present embodiment, the abbreviated records are stored sequentially in the array 520, that is, in order from one end (e.g., the left) of the aggregation to the other. In one embodiment, the pointer 426 refers to the first record in the array 520. In the embodiment shown in FIG. 12, the first record in the array 520 is a abbreviated segment record. The aggregated segment record 422 may also contains data 435 that indicates a count of the number of abbreviated segment records in the corresponding array 520 of abbreviated segment and node records. Thus, these abbreviated records 522 and 523 are accessible through the aggregated segment record through the pointer 426 to the first abbreviated record and the count 435.

g. Abbreviated segments and abbreviated node records.

In a present embodiment, when an aggregated segment record is formed, abbreviated data records are formed that represent the segments and nodes internal to the aggregated segment. Referring to FIGS. 11 and 12, these abbreviated data records include abbreviated segment records 522 and abbreviated node records 523. The abbreviated segment records 522 and abbreviated node records 523 are associated with the aggregated segment record 422 and represent the nodes and segments that are represented in aggregation by the aggregated segment data record 422. These abbreviated records 522 and 523 are maintained in the geographic database in addition to the non-abbreviated segment records 322 that refer to the same road segment features and the non-abbreviated node records 323 that refer to the same node features.

In a present embodiment, these abbreviated records 522 and 523 are maintained relatively close (physically and/or logically) to the aggregated segment record 422 that refers to them. This enables the aggregated segment record to have relatively quick access to the information contained in the abbreviated segment records 522 and abbreviated node records 523. In one embodiment, the abbreviated records 522 and 523 are included in the same layer of data as the aggregated segment record that refers to them. Further, in a present embodiment, in layers above layer 0 but below the highest layer n, the abbreviated segment records 522 and abbreviated node records 523 are included in the same parcel as the aggregated segment record 422 that refers to them. This arrangement is illustrated in FIG. 11 wherein the abbreviated segments 522 and the abbreviated nodes 523 are included in the same parcel 220(7) as the aggregated segment 422 that refers to them. Within each of the parcels above layer 0, such as the parcel 220(7), there may be a plurality of aggregated segment records 422, each of which refers to a plurality of abbreviated segment records 522 and abbreviated node records 523.

When the abbreviated segments 522 and abbreviated nodes 523 are included in the same parcel of data as the aggregated segment record 422 that refers to them, the reference 426 in the aggregated segment record 422 indicates the address or location of the abbreviated segments 522 and abbreviated nodes 523 within the parcel. This reference or pointer 426 may be in the form of an offset from a starting position of the parcel to the abbreviated segment and node records. Alternatively, any other suitable means of reference may be used.

Referring to FIG. 12, as mentioned above, in one embodiment, the abbreviated segment and node records are stored in the array 520. Within the array 520 the abbreviated segment and node records alternate. The first record in the array pointed to by the aggregated segment record is an abbreviated segment record 522, followed by an abbreviated node record 523, followed by an abbreviated segment record 522, and so on, alternating until the last two records in the list are reached, which are an abbreviated node record 523 followed by an abbreviated segment record 522. This alternating arrangement of abbreviated segment and node records corresponds to the alternating arrangement of the physical nodes and road segments that are represented in aggregation by the aggregated segment record. The first abbreviated segment record 522 in the array represents the first segment encountered from an endpoint of an aggregated segment when traversing the aggregation represented by the aggregated segment record from an endpoint thereof The next abbreviated record encounter is the first of the one or more internal nodes of the aggregated segment, starting from the same endpoint of the aggregated segment. These abbreviated records alternate until the abbreviated segment immediately preceding the other endpoint of the aggregated segment is encountered.

Figure 13:
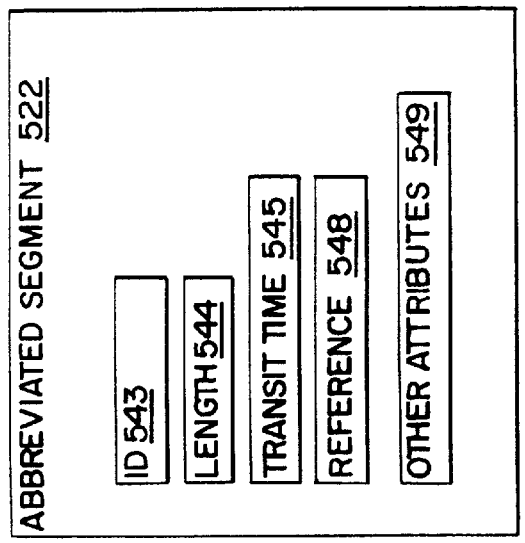
FIG. 13 is a diagram illustrating the components of the abbreviated segment record of FIG. 12.

Referring to FIG. 13, each abbreviated segment record 522 contains a segment identifier 543 and data that indicate a length 544 and a transit time 545. In a present embodiment, the length 544 and a transit time 545 of the abbreviated segment 522 are stored as a single fraction of the length 430 and transit time 434 of the aggregated segment record 422 that refers to them. The abbreviated segment record 522 may also contain additional information 548 by which the fall (i.e., non-abbreviated) version of the segment record (e.g., a segment record 322) can be found. In one embodiment, this information 548 is a data flag which can be used as a reference to a layer 0 parcel identification, as explained below. The abbreviated segment record 522 may also contain additional information 549, such as the bearing of the road segment represented by the abbreviated segment, although such information may be accessed from the referenced layer 0 data record 322 instead.

Figure 14:
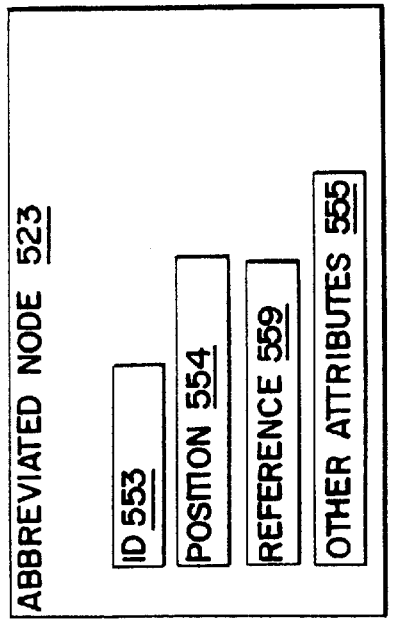
FIG. 14 is a diagram illustrating the components of the abbreviated node record of FIG. 12.

Referring to FIG. 14, each abbreviated node record 523 contains an abbreviated node identifier ("ID") 553 and data that identifies its position 554. The abbreviated node record 523 may also contain additional information, such as a pointer or reference 559, by which the fall (i.e., non-abbreviated) version of the node record 323 can be found. The abbreviated node record 523 may also contain additional information 555.

As mentioned above, the abbreviated segment and node records include references to the non-abbreviated versions of these records. These references may be used to obtain information that is unavailable in the abbreviated segment and node data records, but is included in the non-abbreviated versions of these records. For example, the non-abbreviated versions of these records are used when the calculated route is complete and cross-references to the other data types, such as the map display type and the maneuver type, are required. In the abbreviated segment record 522, the reference 548 is a data flag that indicates whether the abbreviated segment record 522 contains a parcel ID index. (The reference 559 in the abbreviated node record 523 may include a similar data flag.) If an abbreviated segment or node record contains a parcel ID index field, then that abbreviated segment or node record has that parcel ID at layer 0. However, if an abbreviated segment or node record does not contain a parcel ID index, then the node is assumed to have the layer 0 parcel ID of the preceding abbreviated node (or segment) record that did contain a parcel ID field. In this way, if the layer 0 entities referenced by successive abbreviated records are located in the same parcel, the parcel ID number is not required to be repeated for each successive abbreviated record.

h. Upward Referencing

Figure 15:
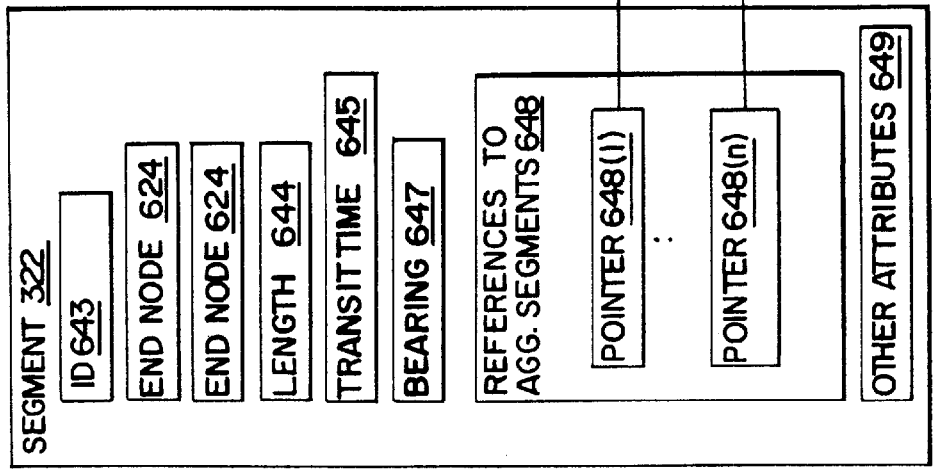
FIG. 15 is a diagram illustrating the kinds of information included in a segment record included in layer 0–3 of the routing data.

In a present embodiment, each of the segment records 322 in layers less than layer n includes data that identifies each of the aggregated segment records 422 in each of the higher layers that represent an aggregation of road segments that includes the road segment represented by the segment record 322. A diagram illustrating this feature of the segment data record 322 is included in FIG. 15. As shown in FIG. 15, in addition to the other types of attributes included in the segment data record 322, there is a reference 648 to each of the aggregated segment records 422 in higher layers that represents aggregations of road segments that include the road segment represented by the segment record. In a present embodiment, the reference 648 in the segment record 322 identifies the aggregated segment records by aggregated segment ID 423 (in FIG. 12) and layer (i.e., 1 through n) in which the aggregated segment record appears. This information is in addition to the other information included in the segment data record 322.

IV. EMBODIMENTS WITH INTERLEAVING OF DATA TYPES a. Separation of aggregated and abbreviated records In a present embodiment, for some layers of routing data above layer 0, the abbreviated segment records 522 and abbreviated node records 523 are stored in the same parcel as the aggregated segment record 422 that refers to them, as described above. However, according to a present embodiment, in at least one layer of routing data above layer 0, the abbreviated segment records and abbreviated node records are stored in a separate parcel from the parcel that contains the aggregated segment record that refers to them. Specifically, in one present embodiment, for the highest layer (i.e., layer n, where n=4), the abbreviated segment and abbreviated node records are stored in a separate parcel from the parcel that contains the aggregated segment record that refers to them. This latter arrangement is shown in FIG. 16. As shown in FIG. 16, the abbreviated segment records 522 and abbreviated node records 523 are stored in a parcel 220(3) that is separate from the parcels 220(1), 220(2) . . that contain the aggregated segment records 422 that refer to them. In a present embodiment, this parcel 220(3) of abbreviated records contains abbreviated segment records 522 and abbreviated node records 523 (and possibly some additional information, such as header information). However, the parcel 220(3) containing the abbreviated records does not include any routing data. As illustrated in FIG. 16, the abbreviated records 522 and 523 are included in the same layer (i.e., layer n) as the aggregated segment records 422 that refer to them. In an alternate embodiment, the parcel 220(3) of abbreviated segment records 522 and abbreviated node records 523 may be located in another layer or elsewhere in the database.

Figure 17:
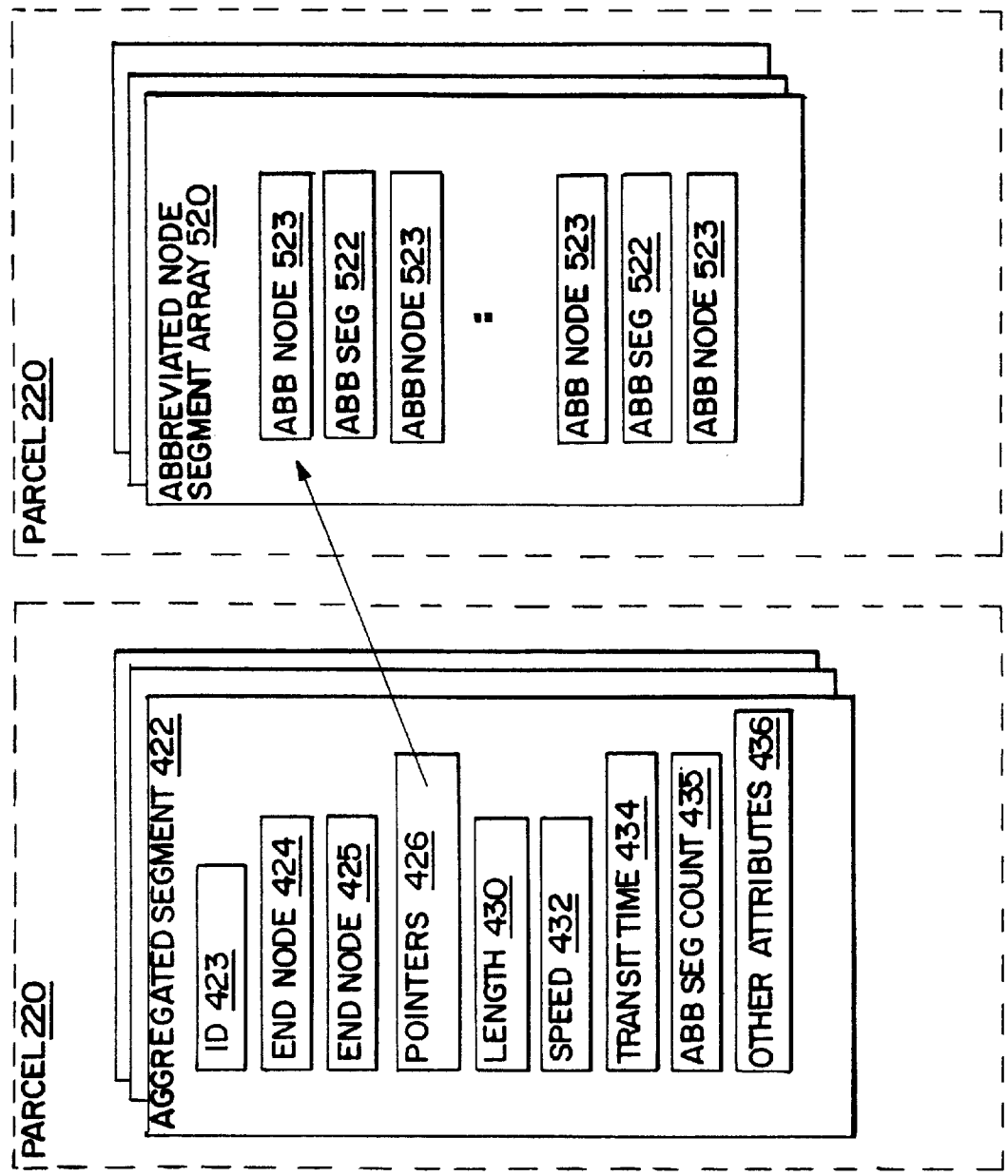
FIG. 17 is a diagram illustrating the components of an aggregated segment record and its associated abbreviated record array of FIG. 16.

As with the aggregated segment records that are included in the layers below layer n, each aggregated segment record includes a pointer or other suitable reference to the abbreviated segment and node records that represent the features represented in aggregation by the aggregated segment record. FIG. 17 illustrates the components of an aggregated segment record and its referenced abbreviated segment and node records according to the embodiment shown in FIG. 16. The aggregated segment record 422 includes at least one pointer 426 to an array 520 that includes abbreviated segment records 522 and abbreviated node records 523. In this embodiment, the pointer 426 refers to the first record in the array 520. Because the abbreviated records are stored in a separate parcel from the aggregated segment records that refer to them, the reference 426 in an aggregated segment record 422 to its associated abbreviated segment and node records 522, 523, includes an appropriate identification of the parcel in which the abbreviated records are located. As in the array 520 described in connection with FIG. 12, the abbreviated records are stored sequentially in the array 520 in order from one end of the represented aggregation to the other. However, unlike the embodiment shown in FIG. 12, when the abbreviated records are in a separate parcel from the parcel that contains the aggregated segment record that refers to them, the first record in the array 520 is an abbreviated node record 523, followed by an abbreviated segment record 522, and so on, alternating until the last two records in the list are reached, which are an abbreviated segment record 522 followed by an abbreviated node record 523. When the abbreviated records are in a separate parcel from the parcel that contains the aggregated segment record that refers to them, the first record in the array 520 is an abbreviated node record 523 which represents one of the end points of the referencing aggregated segment record and the last record in the array 520 is an abbreviated node record 523 which represents the other end point of the referencing aggregated segment record. It is useful to have these aggregated node records 523 that represent the aggregated segment end points in the array 520 when the abbreviated records are located in a separate parcel from the aggregated segment record 422 that refers to them because otherwise there may not be records in the parcel containing the abbreviated records that represent these end points of the aggregated segment. In other respects, the aggregated segment records 422 and abbreviated records 522, 523, in layer n are similar to those in the previously described embodiment.

The abbreviated segment records 522 and the abbreviated node records 523 in the layer n parcel 220(3) include appropriate references to corresponding non-abbreviated segment and node records contained in the parcels 220(4) and 220(5) in layer 0 that represent the same corresponding geographic features. As described in connection with the previous embodiment, if the information included in the non-abbreviated segment or node records is needed for a navigation function, the references included in the abbreviated segment and node records contained in the layer n abbreviated record parcel 220(3) can be used to find the corresponding non-abbreviated segment and node records in the layer 0 parcels 220(4) and 220(5) (illustrated in FIG. 16).

Separating the abbreviated segment and abbreviated node records from the aggregated segment record that refers to them has the effect of allowing the routing parcels that contain the aggregated segment records to hold more routing data other than the abbreviated segment and node record data. This allows the parcels of routing data that contain the aggregated segment records to represent geographic features that are encompassed within larger sized rectangular areas. Therefore, fewer such parcels of routing data are needed when calculating a route across the geographic area thereby generally enhancing navigation system performance for some types of functions such as route calculation.

(According to this alternative embodiment, the abbreviated records are separated from the aggregated records that refer to them only in the highest layer (i.e., layer n, where n=4) of data. In another version of this alternative embodiment, the abbreviated records may be separated from the aggregated records in other layers as well. According to still another version of this alternative embodiment, the abbreviated records may be separated from the aggregated records that refer to them in all the layers of data in which aggregated records are present.)

b. Kinds of Interleaving

As previously mentioned, storing the abbreviated records separately from the routing data that includes the aggregated segment records that refer to them can provide certain advantages that enhance navigation system performance. Further advantages can be obtained in an embodiment wherein the routing data (that include the aggregated segment data records) are interleaved with the abbreviated records. This may reduce the search and access times for data when performing certain kinds of navigation functions and thereby possibly further enhance navigation system performance. Specifically, in this further alternative embodiment, the parcels that contain the routing data that include aggregated segment data records are interleaved with the parcels that contain the abbreviated records that are referenced by the aggregated segment records within the same layer.

Figure 18:
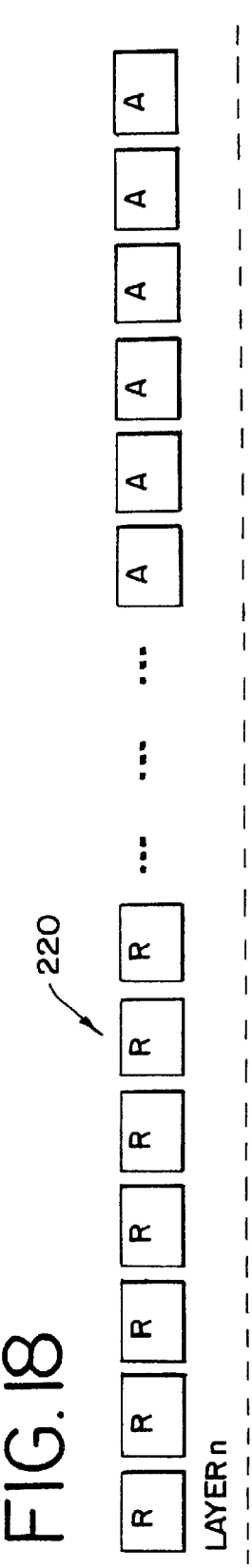
FIG. 18 is a diagram representing one arrangement for interleaving different types of data within a layer of data.
Figure 19:
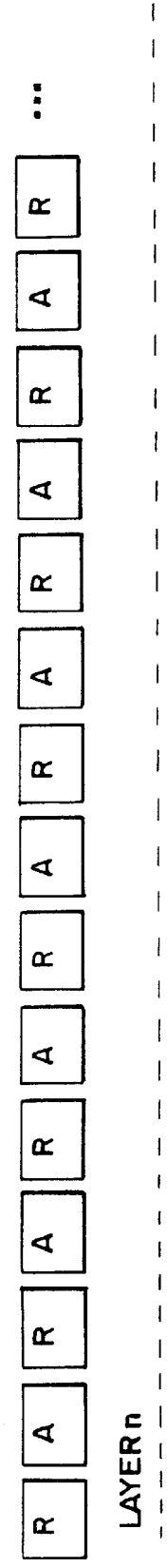
FIG. 19 is a diagram representing another arrangement for interleaving different types of data within a layer of data.
Figure 20:
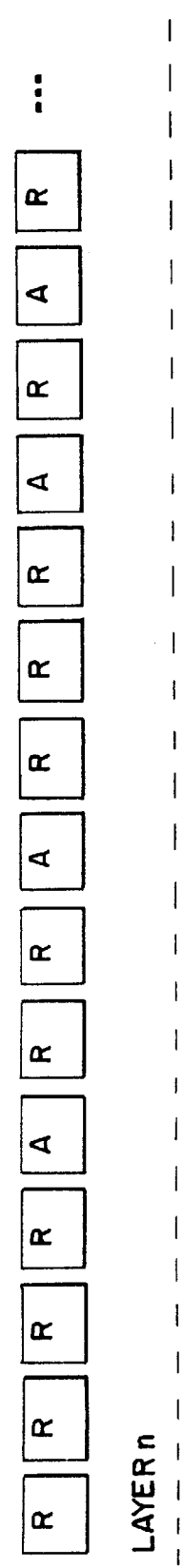
FIG. 20 is a diagram representing still another arrangement for interleaving different types of data within a layer of data.

FIGS. 18, 19, and 20 show three different ways that parcels containing routing data (including aggregated segment records) and parcels that contain abbreviated record data (which are referenced by the aggregated segment records) can be arranged within a layer. For purposes of this embodiment, the interleaving of abbreviated record data with routing data within a layer is described. The advantages that result from interleaving different data types, and in particular parcels of different data types, are not limited to just routing data and abbreviated record data. It is understood that the disclosed concepts can be extended to other types and layers of data as well, as described below. Therefore, various navigation functions can benefit from the performance enhancements associated with interleaving data types.

FIG. 18 shows a plurality of parcels 220 within a layer n of routing data. These parcels include parcels that include routing data (labeled with an "R") and parcels that include abbreviated segment and node records (labeled with an "A"). The routing parcels contain aggregated segment records that include references to the abbreviated segment and node records that represent, individually, the road segments and endpoints thereof that the aggregated segment records represent in aggregation. In the embodiment shown in FIG. 18, even though all the parcels that contain abbreviated segment and node records are located in the same layer of routing data as the routing parcels that include the aggregated segment records that refer to them, all the parcels that contain the abbreviated segment and node records are located and stored apart from (i.e., before or after) all the parcels that contain the layer n routing parcels that include the aggregated segment records that refer to them. As mentioned above, placing the parcels that contain the abbreviated segment and node records in the same layer as the parcels that contain the aggregated segment records that refer to them affords the advantage that generally less time is required to access the abbreviated records when they are referenced by the aggregated segment records, thereby leading to improved navigation system performance.

Although the embodiment shown in FIG. 18 provides potential performance advantages, still further advantages can be obtained if the parcels containing the abbreviated segment records are placed even closer to the parcels containing the aggregated segment records that refer to them. The embodiment shown in FIG. 19 shows an arrangement of parcels that affords this advantage. In the embodiment of FIG. 19, following each parcel of routing data is a parcel containing abbreviated records. The abbreviated records in each parcel of abbreviated records are referenced by the aggregated segment records in the immediately adjacent parcel. (In FIG. 19, the parcel containing the abbreviated segment and node records is shown immediately following the parcel that contains the routing data records that include the aggregated segment records that refer to them. In an alternative embodiment, the parcel containing the abbreviated segment and node records can immediately precede the parcel that contains the routing data records that include the aggregated segment records that refer to them.)

The arrangement shown in FIG. 19 may afford even further advantages over the embodiment shown in FIG. 18 for certain functions. Because the parcel containing the abbreviated segment and node records is immediately adjacent to the parcel containing the routing data that includes the aggregated segment records that refer to them, even less time may be required to access the abbreviated records when they are referenced by the aggregated segment records, thereby leading to even further improved navigation system performance.

A disadvantage associated with the arrangement shown in FIG. 19 is that the amount of data associated with the abbreviated segment and node records referenced by the aggregated segment records in a single parcel of routing data does not necessarily conform to an ideal parcel size. If the routing parcel contains relatively few aggregated segment records or aggregated segment records that represent aggregations of relatively few segments, there will be a correspondingly few abbreviated records in the adjacent parcel of abbreviated records. Similarly, if the routing parcel contains relatively many aggregated segment records or aggregated segment records that represent aggregations of relatively many segments, there will be a correspondingly many abbreviated records in the adjacent parcel of abbreviated records. In the embodiment of FIG. 19, the data size requirement for the abbreviated segment and node records referenced by the aggregated segment records in each single parcel of routing data depends upon the number and kind of aggregated segment records in the parcel of routing data. In turn, the number and kind of aggregated segment records in a parcel of routing data depends, at least to some extent, on the represented road network. Since road networks can be relatively variable, the data size requirements for the abbreviated segment and node records referenced by the aggregated segment records in a single parcel of routing data can also vary considerably.

In general, the abbreviated segment and node records referenced by the aggregated segment records in a parcel require less than, and sometimes considerably less than, an ideal parcel size. This means that in the embodiment shown in FIG. 19, substantial padding may be required to be added the abbreviated record data in some parcels of abbreviated records to maintain a uniform parcel size among the parcels within the layer. This has the result that the parcels that contain the abbreviated records may be less than a desired fill percentage. If a desired parcel fill percentage is 80%, some of the parcels that contain abbreviated segment and node records may be less than 50% or even less than 20% full. It is generally undesirable to have parcels substantially less than fall. One reason that less than full parcels is undesirable is that data storage space is wasted that could otherwise be used to store information that can be valuable to the end-user. Another undesirable effect of having parcels that are substantially less than fall is increased fragmentation of the database. This can result in increased search and access times leading to poor performance.

Another potential disadvantage of the embodiment of FIG. 19 is that under some circumstances, the data requirements for the abbreviated segment and node records referenced by the aggregated segment records in a single parcel of routing data may exceed the maximum parcel size.

With respect to the embodiment in FIG. 19, it is possible to make the parcels containing abbreviated segment and node records smaller (or larger) in size than the immediately adjacent parcels that contain the routing data that include the aggregated segment records that to refer to them. However, making the parcels containing the abbreviated segment and node records different sizes than the parcels containing the routing data does not reduce fragmentation. Furthermore, since the factors used to determine a desired parcel size may include specific characteristics of the media upon which the data are stored, there are relatively few available preferred sizes in which a parcel can be provided in order to obtain the desired performance characteristics.

Thus, although the interleaving arrangement shown in FIG. 19 may provide performance advantages in navigation systems for some data types, it may not be suitable for other data types. With respect to the embodiment of interleaved data types shown in FIG. 19, it is best suited for types of data in which the parcel sizes of the different data types can be balanced readily.

FIG. 20 shows another arrangement for interleaving parcels of abbreviated segment and node records with parcels containing routing data that include the aggregated records that reference abbreviated segment and node records. In FIG. 20, the parcels that contain abbreviated segment and node records are formed to have a size that conforms to a desired parcel size and are formed to have a generally high fill percentage. In one embodiment, the parcels containing abbreviated segment and node records may have the same size as the routing data parcels that contain the aggregated segment records that refer to them. For example, if the routing data parcels are provided in a 16 K size, the parcels containing the abbreviated segment and node records may also be provided in sizes of 16 K each. Other sizes are suitable.

In FIG. 20, the parcels containing routing data are interleaved with the parcels containing the abbreviated segment and node records. In a present embodiment, each parcel that contains abbreviated segment and node records is grouped together with the one or more routing parcels that contain the aggregated segment records that refer to them. In one embodiment, the parcel that contains the abbreviated segment and node records that are referenced by aggregated segment records contained in one or more routing parcels are located immediately after these routing parcels. In an alternative embodiment, the parcel that contains the abbreviated segment and node records that are referenced by aggregated segment records contained in one or more routing parcels may be located immediately before these routing parcels. In a preferred embodiment, the placement of the parcel that contains the abbreviated records depends upon the spatial organization of the data within the layer, as described further below.

Referring to FIG. 20, four layer n parcels containing routing data are followed by one parcel containing abbreviated segment and node records. The one parcel containing abbreviated segment and node records contains all the abbreviated segment and node records referenced by all the aggregated segment records contained in the four routing data parcels that immediately precede it. In FIG. 20, following the first abbreviated record parcel are two more routing parcels followed by another parcel containing abbreviated records. This second parcel of abbreviated records contains the abbreviated records referenced by the aggregated segment records contained in the two routing parcels immediately preceding it. In the embodiment shown in FIG. 20, the number of parcels of routing data and the number of parcels of abbreviated records are determined in order to (1) maintain a desired parcel size and fill percentage among the parcels in the layer, and (2) maintain the spatially parcelized routing parcels close to the spatially parcelized abbreviated record parcels that represent the same geographic features. The embodiment shown in FIG. 20 combines the advantage that the abbreviated segment and node records are stored relatively close to the aggregated segment records that refer to them with the advantage that all the parcels conform generally to a desired parcel size and fill percentage.

c. Process for forming interleaved data

As noted above, in a preferred embodiment the routing parcels are spatially parcelized, and likewise the parcels containing the abbreviated segment and node records are spatially parcelized. In a preferred embodiment, the parcels containing the abbreviated segment and node records are parcelized in parallel with the routing data parcels with which they are interleaved. A process for forming the interleaving arrangement is described below.

Figure 21:
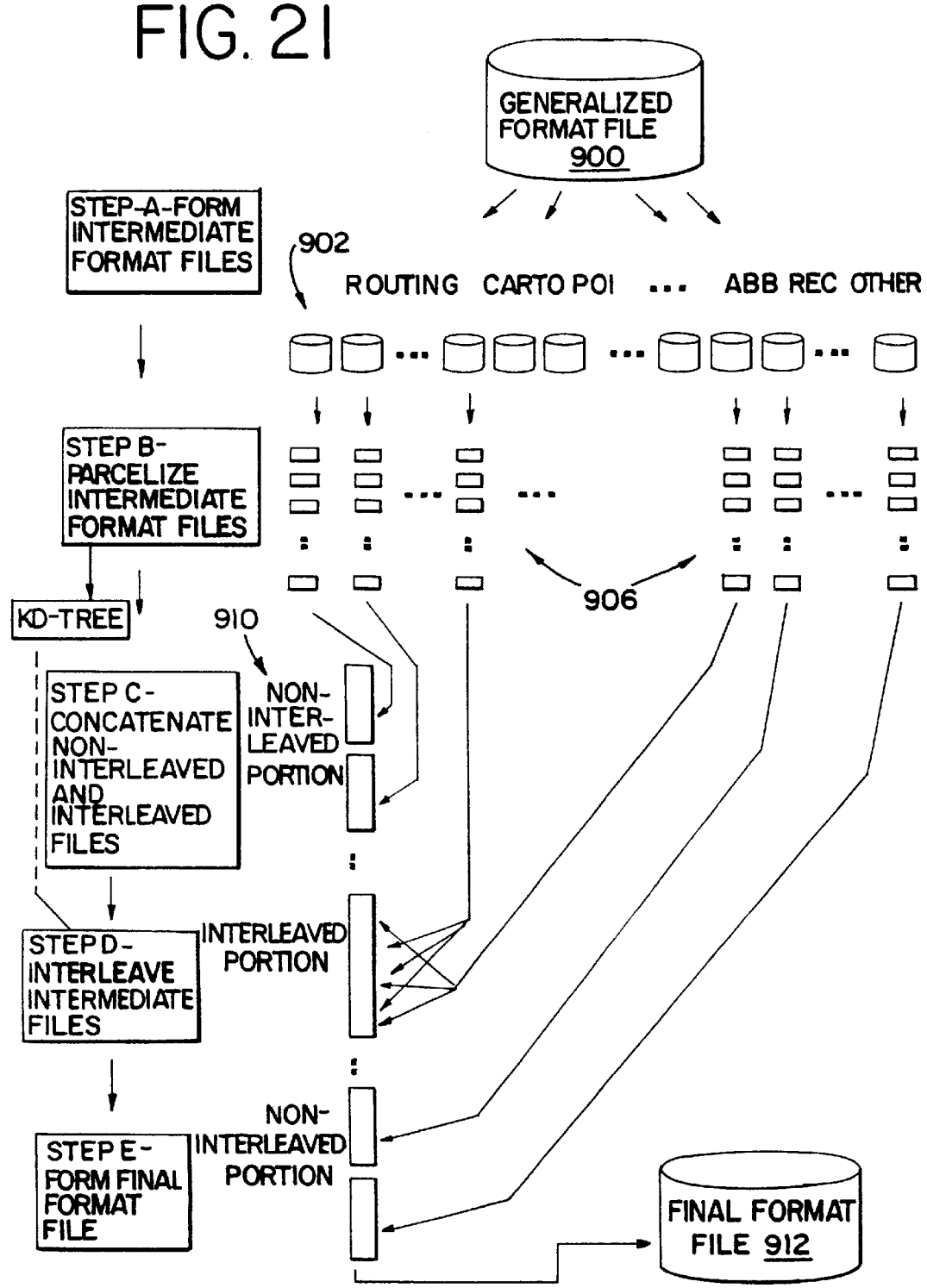
FIG. 21 is a diagram illustrating the steps in forming a geographic database having a portion with different data types interleaved with each other, as shown in FIG. 20.

Processes for forming a geographic database including layered parcelized routing data are disclosed in Ser. Nos. 08/924,328, now U.S. Pat. No. 5,974,419, 08/935,809 now U.S. Pat. No. 5,953,722 and 08/740,295, now U.S. Pat. No. 5,968,109 the entire disclosures of which are incorporated by reference herein. Briefly, one process for forming a layered parcelized geographic database having at least one interleaved portion is illustrated in FIG. 21. (In FIG. 21, the general Steps of the process are shown on the left and the corresponding component parts used in the Steps are shown on the right.)

Starting with a geographic database 900 that is provided in a generalized data format, separate intermediate format files 902 for each data type and layer are formed (at Step A). The generalized data format geographic database 900 may be in a proprietary format or in a non-proprietary format. In the generalized data format geographic database file 900, the geographic data may be undifferentiated as to type and layer. These intermediate format files 902 formed from the generalized data format database file 900 are created in order to derive each of the different types of data, such as routing, cartographic, point-of-interest, maneuver, and so on, as shown in FIG. 5, as well as to derive each of the layers of some of these types, as shown in FIG. 6.

After each of these separate intermediate format files 902 is created, each of these intermediate format files 902 is parcelized to form parcels 906 of data records of each data type for each layer (at Step B). Different kinds of parcelization processes can be used, including different kinds of processes for spatial parcelization, as described above. As the parcels 906 for each of the separate types and layers are formed, the parcels 906 for each layer and type are concatenated into a single file 910 (at Step C). With respect to a portion of the concatenated file 910 in which parcels are interleaved, the parcels from the two or more parcelized intermediate files 906 are selected and interleaved (at Step D), as described in more detail below.

As the separate parcels 906 for each of the separate types and layers are formed, parcel identifications are assigned. After all the separate parcels 906 for each of the separate types and layers are concatenated into a single file 910 and parcel identifications are assigned, parcel references throughout all the data records and indices are updated to reflect the new assigned parcel identifications to form a final format file 912 (at Step E).

These general steps for forming a geographic database represent only one way that a geographic database can be formed and it is understood that there are other methods for forming a geographic database that incorporates the interleaving of different types of data. A more detailed description of aspects of the process for forming a geographic database having an interleaved portion is described as follows:

According to one embodiment, to form a geographic database that interleaves different types of data, a separate intermediate file is formed for each of the different types of data that are to be interleaved. For example, in order to form a geographic database that includes parcels that contain routing data including aggregated segment records and separate parcels that contain abbreviated segment and node records referenced by the aggregated segment records (as shown in FIGS. 17–20), separate intermediate format files are formed for the routing data and for the abbreviated segment and node data. The separate intermediate format file for the abbreviated records contains the portions of the generalized data format geographic database file that are necessary to derive the abbreviated segment and node records (such as the records 522 and 523 in FIGS. 13 and 14, respectively).

If parcels containing abbreviated records are to be interleaved with parcels that contain routing data in more than one layer, separate intermediate format files of abbreviated segment and node records are formed for each separate layer. In a present embodiment, the abbreviated segment and node records are stored in separate parcels from the aggregated segment and node records that refer to them only in the highest layer (i.e., layer n, where n=4) of the routing data. However, in alternative embodiments, abbreviated segment and node records may be stored in separate parcels from the aggregated segment and node records that refer to them in any layer that contains aggregated segment records.

In addition, in further alternative embodiments, if parcels of data types other than routing data and abbreviated records are to be interleaved, intermediate format files of these different data types are formed, as necessary.

Once the intermediate format files for each layer of routing data and each layer of abbreviated segment and node records are formed, each of these intermediate format files is parcelized. In a preferred embodiment, routing data layer 0 is parcelized first. Alternatively, another of the types of data, such as the cartographic data or the maneuver data, may be parcelized first. In parcelizing the routing layer 0 data, any suitable parcelization method can be used, such as any of the parcelization methods disclosed in Ser. Nos. 08/924,328, now U.S. Pat. No. 5,974,419, 08/935,809, now U.S. Pat. No. 5,953,722, and 08/740,295, now U.S. Pat. No. 5,968,109 the entire disclosures of which are incorporated by reference herein.

After the routing layer 0 data are parcelized, the higher layers of routing data are parcelized. In a preferred embodiment, the higher layers of routing data are parcelized in parallel with the parcelization method used for routing layer 0 data. This means that when forming parcels for a higher layer of routing data, the same boundaries that were defined in the process of determining the rectangular areas associated with the routing layer 0 parcels are used to define the rectangular areas associated with each higher layer parcel. Of course, since higher layers of data include fewer records, higher layer parcels may be associated with larger rectangular areas. However, if any higher layer parcel is associated with a larger rectangular area than a lower layer parcel, the larger rectangular area associated with a higher layer parcel will exactly encompass the smaller rectangular areas associated with two or more lower layer routing data parcels.

After the intermediate format file representing a layer of routing data having aggregated segments is parcelized, the intermediate format data file containing the abbreviated segment and node records for the same layer is parcelized. (Note that the intermediate data file containing the abbreviated segment and node records can be parcelized immediately after the layer of routing data are parcelized, or alternatively, the intermediate data file containing the abbreviated segment and node records can be parcelized after other types or layers of data are parcelized.) In a preferred embodiment, the intermediate data file containing the abbreviated segment and node records is parcelized in parallel with the routing data. The parallel parcelization of an intermediate format file containing abbreviated segment and node records is similar to the parallel parcelization of intermediate format files of higher layers of routing data, as described above. Thus, the same boundaries that were defined for the rectangular areas associated with the routing layer 0 parcels are used, to the extents necessary, to define rectangular areas associated with parcels of the abbreviated segment and node records. Thus, a rectangular area associated with a parcel of abbreviated segment and node records either corresponds exactly to the rectangular area associated with the routing data parcel that includes the aggregated segment records that will refer to the abbreviated segment and node records or corresponds exactly to two or more rectangular areas associated with the two or more routing data parcels that include the aggregated segment records that refer to the abbreviated segment and node records. This arrangement is illustrated graphically in FIG. 22. (In the event that the abbreviated records referenced by the aggregated segment records in a parcel of routing data comprise a substantially larger amount of data than the routing parcel, the opposite relationship will apply, i.e., the rectangular areas associated with two or more abbreviated records parcels will exactly encompass the rectangular areas associated with a single routing parcel.)

Figure 22:
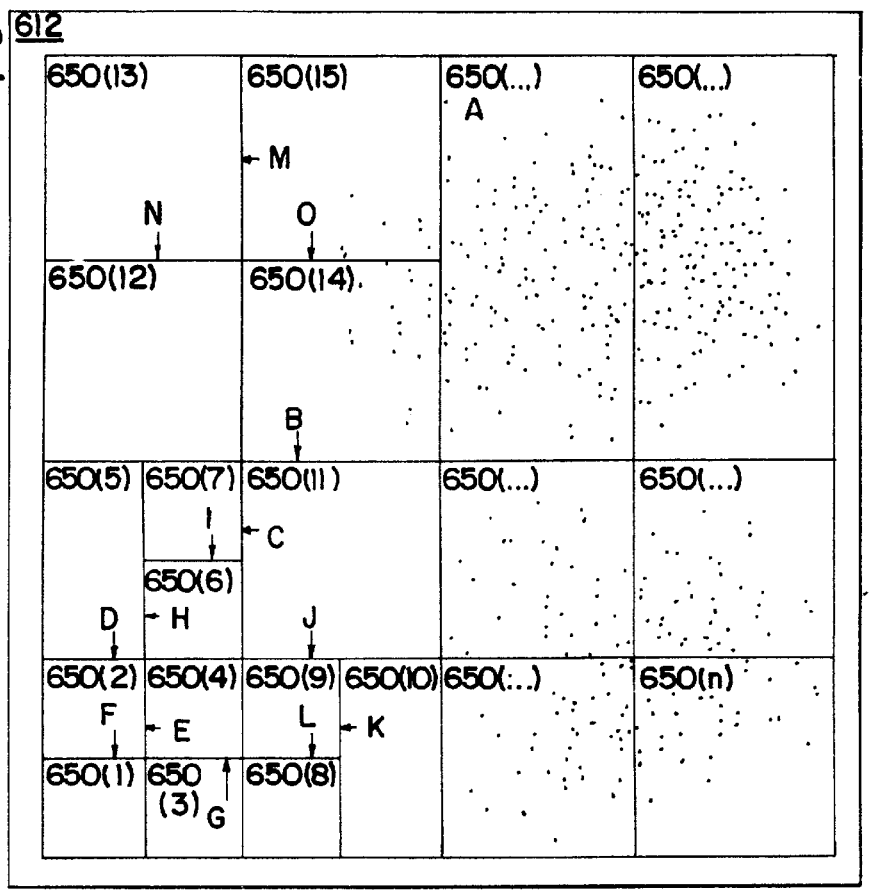
FIG. 22 is a diagram of a map illustrating the application of a parcelization step in FIG. 21 to geographic data that represent features in the illustrated region.

FIG. 22 shows a map 612 of a portion of a geographic region. The region is overlaid with a plurality of boundary lines. These boundary lines are selected according to a parcelization method in order to determine a plurality of rectangular areas. As mentioned above, any suitable parcelization method may be used. The boundaries forming each of the rectangular areas are selected so that each rectangular area encompasses geographic features that are represented by geographic data records contained within a separate parcel for a given layer and type of data. In FIG. 22, the boundaries define the rectangular areas that encompass geographic features represented by routing data records contained in separate parcels of routing layer 0 data (It is understood that FIG. 22 shows just a portion of a geographic region. In a geographic region represented by a geographic database, such as the geographic database 40 used with a navigation system 10 in FIG. 1, there may be hundreds of such rectangular areas, each associated with a separate parcel of routing layer 0 data.)

When forming parcels of abbreviated segment and node records, the boundary lines previously defined for the routing layer 0 data are used to define the rectangular areas that encompass the abbreviated segment and node records to be contained in each parcel. In a present embodiment, these abbreviated segment and node records have relatively smaller data size requirements than the routing data for a corresponding area. Therefore, parcels formed of abbreviated segment and node records may represent larger rectangular sized areas. However, since the boundary lines to be used when defining a rectangular area associated with a parcel are constrained to those previously defined for routing layer 0 data, a rectangular area associated with a parcel of abbreviated segment and node records includes entire rectangular areas associated with routing layer parcels. For example, in FIG. 22, if the abbreviated segment and node records that represent the features contained in the four rectangular areas 650(1), 650(2), 650(3), and 650(4) are less than a maximum parcel size, a parcel of all these abbreviated segment and node records can be formed. Similarly, if the abbreviated segment and node records that represent the features contained in the two rectangular areas 650(5) and 650(6) are less than a maximum parcel size, a parcel can be formed of these abbreviated segment and node records.

After parcelization, the intermediate format file contains the parcelized abbreviated segment and node records in a plurality of parcels. Each parcel is padded to a desired size. The parcels are arranged in an order that reflects the spatial organization of the data.

Once the intermediate format file containing the routing data for layer n is parcelized and the intermediate format file containing the abbreviated segment and node data for layer n is parcelized, the parcels of the two intermediate format files of different data types can be interleaved. The intermediate format files to be interleaved are identified to a compiler or other process that forms the final format geographic database file. The identified files are input into the compiler or other program or process. (In a present embodiment, the compiler also receives as input the layers and types of data that are not going to be interleaved.)

Figure 23:
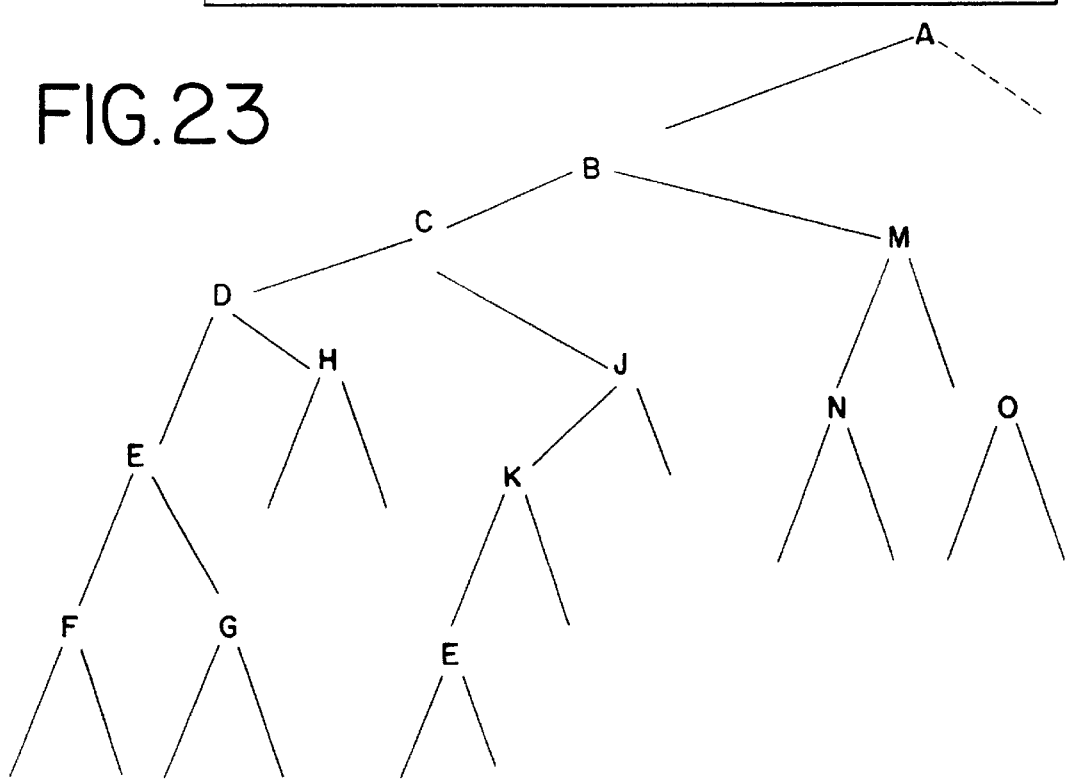
FIG. 23 is a diagram of a kd-tree that corresponds to the parcelization step illustrated in FIG. 22.

As illustrated in FIG. 21, in forming the final format geographic database file, the portion of the file that contains interleaved parcels of different data types may be included among other portions that include non-interleaved parcels, if any. For example, the compiler may store the non-interleaved parcels of routing layer data 0, followed by the non-interleaved parcels of routing layer 1, and so on. When the compiler gets to an interleaved layer, (e.g., layer n routing data), both the parcelized intermediate format file containing routing layer n data and the parcelized intermediate format file containing the layer 4 abbreviated records are present. In forming the final format geographic database file, the spatial organization of the routing data and abbreviated record data in the interleaved layer is maintained. To facilitate maintaining the spatial organization of the data, a kd-tree is used during the interleaving process. FIG. 23 shows a kd-tree representing the parcels formed of the data encompassed within the rectangular areas of FIG. 22. In a preferred embodiment, a kd-tree is formed during the parcelization of the routing layer 0 data. An entry or node in the kd-tree is associated with each "cut" (i.e., division) of an encompassing rectangular area which is made when forming the individual smaller rectangular areas associated with each of the parcels of routing layer 0 data. Each leaf node (i.e., a node with no children nodes) of the kd-tree represents one of the routing layer 0 parcels. Therefore, a layer 0 parcel can be found using this kd-tree. (A form of the kd-tree can be stored as a file and used as search tool in finding data spatially within the parcels, as known to those of skill in the art.) Each parcel (such as a higher layer parcel or a parcel of abbreviated records) which is formed without making all the cuts required for the layer 0 parcels is represented by one of the internal nodes of the kd-tree.

The kd-tree formed when parcelizing the routing layer 0 data can also be used when interleaving the parcels of routing data and the parcels of abbreviated record data (as illustrated at Step D in FIG. 21). The rectangular areas associated with the parcels of layer 4 routing data and parcels of abbreviated record data do not necessarily share the exact same boundaries (i.e., in FIG. 22) as the rectangular areas associated with the parcels of layer 0 routing data that were used to form the kd-tree. Moreover, the rectangular areas associated with the parcels of abbreviated records do not necessarily share the exact same boundaries as the rectangular areas associated with the parcels of routing layer 4 data. However, the cuts used to form the layer 4 routing parcel boundaries and the abbreviated record parcel boundaries are included in the kd-tree, since these cuts were made in the process of forming the routing layer 0 parcels. Accordingly, when interleaving these different types of data, the kd-tree can be used to spatially organize the parcels of these different types of data. The nodes of the kd-tree are traversed in order. As each node of the kd-tree is encountered in order, if a routing layer 4 parcel or an abbreviated record parcel was formed by the cut associated with the kd-tree node, the parcel (routing or abbreviated record or both) is added to the portion of the final format file corresponding to the routing layer 4 data. By traversing the kd-tree in order, the routing layer 4 parcels and abbreviated record parcels associated with the same geographic features can be identified and grouped together in the portion of the final format file corresponding to routing layer 4. In this manner, since the abbreviated records represent the same geographic features as the aggregated segment records that refer to them, by using the represented geographic features, the abbreviated segment records can be placed close to the aggregated segment records that refer to them.

After the routing data parcels and abbreviated records parcels are interleaved, they can be concatenated with the parcels of other types and layers into the final format file. Parcel identification numbers are assigned and parcel references within each parcel are updated, as necessary to form the final format file 912 (in Step E of FIG. 21).

d. Alternative interleaved embodiments

For purposes of the above described embodiment, it was disclosed that parcels containing abbreviated records can be interleaved in the same layer as parcels containing other kinds of data, such as routing data including aggregated segment records. Interleaving of different data types can be extended to other types of data. Any two kinds of spatially organized data can be interleaved at any level in order to provide advantages for certain navigation functions. For example, cartographic data can be interleaved with point-of-interest data. Similarly, cartographic data can be interleaved with routing data. Likewise, non-spatially organized types of data can be interleaved with each other or with spatially organized types of data.

In another embodiment, index files for certain kinds of data types can be interleaved with the data type that is being indexed.

In still further alternative embodiments, parcels of different types can be interleaved according to a custom ordering. The custom ordering can be defined by an arbitrary function that specifies an explicit ordering pattern. During formation of the final format file, the compiler receives instructions along with the identification of the two or more parcel types to be interleaved. The instructions specify the pattern and/or ordering for each parcel of each type. The compiler then implements this ordering when the parcels are interleaved into the final format file.

V. OPERATION a. Rank suppression

The disclosed embodiments facilitate using the geographic database thereby providing the potential for improved navigation system performance. The disclosed embodiments may be used with different kinds of navigation systems and may be employed in systems that employ different search routines or algorithms for determining a route between an origin and a destination in the geographic region. These search routines may differ in the manner in which they use the geographic data to calculate a route. One way that a route search routine uses the geographic data to calculate a route is to evaluate alternative potential routes from points between the origin and destination to determine which one is most promising to form part of an optimal route between the origin and destination. For example, a route searching routine uses the geographic data to evaluate some or all of the successor road segments leading from an intersection point between the origin and destination to determine which successor road segment is the most promising based upon some criteria, such as distance, time, etc. This evaluation of successor road segments can be relatively time consuming. This is one of the reasons why the road segment records are assigned a rank in the geographic database and why the road segment records may be provided in a plurality of layers based upon rank. Using higher layers provides an advantage for route calculation purposes since higher layers include fewer road segment records that can be evaluated from each intersection. Using aggregated segment records also provides advantages by reducing the number of segments or nodes that can be evaluated.

When a route calculation program determines a route, the calculated route is formed of a listing of road segment records that represent the individual road segments that constitute the route. Each consecutive pair of road segments in the calculated list shares a common node, thereby ensuring the integrity of the route.

When a route calculation program calculates a route, it may initially use layer 0 data. This may be necessary because the starting point or the destination of a route is not necessarily located on a higher ranked road. Higher layers of the geographic database may be used when calculating portions of the route away from the starting location or destination location, i.e., along the middle portion of the route. As stated above, a valid route includes a listing of segments wherein consecutive segments share a common node between them. Therefore, when segments acquired from a higher layer of the database are used in a route they are "entered" from their end points. When a valid route includes segment records acquired from different layers, the point along the route at which higher layer data can be used is limited to those positions that correspond to an end point of a segment in the higher layer. (The endpoints of segments in higher layers are necessarily also located in lower layers). This means that before a route calculation program can take advantage of the higher layers, it has to evaluate nodes and segments in a lower layer in order to find an intersection in the lower layer that corresponds to an end point of a segment in the higher layer to which the jump to the higher layer can be made.

In the layer in which they are present, aggregated segment records replace the individual road segment records that represent the same road segments for route calculation purposes. Thus, the internal nodes of aggregated segments are not available as endpoints of valid segments at the layer at which the aggregated segment records are present. It follows therefore that the internal nodes of aggregated segments are not available as locations from which a route calculation program can switch from a lower layer to the higher layer. The presence of aggregated segments in a layer reduces the number of locations at which a route calculation program can switch into the layer from a lower layer. When an aggregated segment record represents a relatively large aggregation of road segments, it includes a correspondingly large number of internal nodes which are no longer available as places at which a switch to the higher layer can be made.

To improve navigation system performance, a function call is provided that can be used when the successors of a segment record in a layer below the highest layer n of data are being evaluated. The function call returns the end points of any aggregated segment record in any higher layer that represents an aggregation of segments that includes the segment represented by the road segment record in the lower layer. Use of this function call is facilitated because each road segment record in each layer below layer n includes data (648 in FIG. 17) that identifies each of the aggregated segment records in each of the higher layers that represents an aggregation of road segments that includes the road segment represented by the segment record from which the function call is made. Using these data 648 (which in a present embodiment includes the aggregated segment ID and layer), the parcels that contain the aggregated segment records can be identified and accessed. Each of these parcels is loaded, and the data in each of the aggregated segment records can be evaluated. Specifically, the data that identify the end points of each aggregated segment are returned. This information can be obtained for each of the higher level aggregated segment records that represents an aggregation that includes the segment represented by the segment record in the lower layer. Then this information can be evaluated for route searching purposes. Specifically, the information can be used to determine whether it would be advantageous to incorporate into a route being calculated that portion to either of its end points of any aggregation represented in any higher layer. The evaluation can be performed in the same way that successors of a segment in the same layer are evaluated. The route calculation routine compares the returned end points of the higher layer aggregated segments with the end points of each of the same layer successor segments of the segment being evaluated. If one of the end points of the aggregated segment returned by the function call provides a more promising solution route compared to all the same layer successor segments being evaluated (based upon the applicable criteria of the route calculation function), the route calculation function incorporates that portion of the represented aggregation to its endpoint into the route being calculated. Specifically, the route calculation routine uses the abbreviated record information associated with the aggregated segment record to identify the segment records in the lower layer to be added to the calculated solution route to get to the promising end point of the aggregated segment in the upper layer. These segment records can be added to the solution route without any further evaluation, thereby avoiding time-consuming calculations. Once these lower layer records are added to the solution route to get to the end point of the aggregated segment, the higher layer data are evaluated to find further successors.

On the other hand, if the endpoints of the aggregated segment returned by the function call are not more promising as a solution route than the successors at the lower layer, route calculation continues at the lower layer. Moreover, the route calculation routine may use this information to avoid any lower layer segments that lead to the endpoints of the aggregated segment since evaluation of these endpoints has already indicated that these are not promising locations from which a potential solution route can be found.

This method described above provides an improved way to use aggregated segment records in a geographic database. This method extends the advantages of using aggregated segment records (which are available at higher layers) to situations when the route calculation function is using lower layers of data. The disclosed method allows the aggregated segment information to be used even before an actual "jump" to the higher layer is made. This method has the potential for reducing the number of calculations that are required to be made during route calculation. This method is enabled, in part, by the upward references provided in the segment records in the layers below the highest layer n, which provide a means to quickly identify the aggregated segment records in higher layers that represent aggregations of road segments that include the road segment represented by the road segment record at the lower layer.

b. Two ended searches

As mentioned above, there are various navigation search techniques. One kind of route search technique determines an optimum route by calculating from both the starting location and the destination location and working toward the middle. When the two ends meet, a solution route is found. When aggregated segments are used, the search route from one end may include an aggregated segment and the search route from the other end may include segments from a layer below which the aggregated segment is present. The disclosed embodiments readily enable the segments in these two routes to be compared so that it can be determined whether a solution route has been found.

As disclosed above in connection with a present embodiment, the aggregated segment records at each layer above layer 0 refer to abbreviated segment and node records. As stated above, these abbreviated segment and node records are relatively close to the aggregated segment records that refer to them. These abbreviated segment and node records all include references to the segment and node records in layer 0 which represent the same segments and nodes that are represented in aggregation by the aggregated segment records. When a two-ended search uses an aggregated segment, the layer 0 records that represent these same segments can readily be determined from the abbreviated segment records associated with the aggregated segment. Using this reference information, the segments in each route of a two ended search can readily be compared, thereby enabling the two-ended search to use a geographic database that includes aggregated segments.

c. Real-time traffic

Another advantage provided by the disclosed embodiments is that they facilitate real-time traffic updates. Real-time traffic updates provide information about the current traffic conditions in a geographic region to end-users of navigation systems. These updates may be provided to the end-users via a wireless communication system, such as radio broadcasts, cellular, and so on. These real-time traffic updates identify the locations of traffic jams, or may provide travel times along certain segments of roads in the geographic region. The route calculation program in the navigation system can use the information in these real-time traffic broadcasts when calculating an optimum route. One way this is accomplished is to add a weighting factor to a normal travel time associated with certain road segments when indicated by the real-time traffic information. These weighting factors applied to certain road segments may cause the route calculation program to select alternate road segments during calculation of a route thereby resulting in a different solution route being determined.

There are several different formats in which the real-time traffic broadcasts may be provided. In one embodiment, the real time traffic information is provided in a manner that enables weighting factors to be applied to road segment or node records in layer 0 of the routing data. If the navigation system is using an embodiment of the geographic database that includes aggregated segment records, a means is required that enables the real-time traffic information to be applied to the aggregated segment records so that the weighting factors can properly be taken into account when using aggregated segment records to calculate a route.

This is accomplished by using the references in the abbreviated records 522 and 523 to which the aggregated segments 422 refer. As mentioned above, the abbreviated segment records 522 and abbreviated node records 523 which are associated with each aggregated segment 422 refer to the non-abbreviated segment and node records at layer 0 that represent the same segments and nodes that the aggregated segment record represents in aggregation. By means of these references to layer 0 segment and node records, a route calculation program using an aggregated segment can readily identify the layer 0 segment and node records that represent the same segments and nodes represented in aggregation by the aggregated segment record. The route calculation program then determines whether any real-time traffic information has been associated with any of these layer 0 segment or node records. This can be done by maintaining a table that lists layer 0 segments and nodes that have weighting factors applied to them. In this manner, a route calculation program that uses aggregated segment records can take into account real-time traffic information when calculating a route.

Alternatively, the upward references (e.g., reference 648 in FIG. 17) in the layer 0 segment data record 322 can be used to apply the real time traffic weighting factors to any higher layer aggregated segment records that represent an aggregation of segments that includes the segment represented by the segment record.

VI. FURTHER ALTERNATIVE EMBODIMENTS

The embodiments described above represent only specific implementations of the inventive concepts disclosed herein. Various other implementations and alternative embodiments are considered to be encompassed within the scope of the present disclosure. For example, in the disclosed embodiments, aggregated segment records are stored in higher layers that are physically distinct from the lowest layer (e.g., "layer 0") of data. In one alternative embodiment, separate layers of data may be provided without physically storing separate layers. Instead, the separate layers may be provided by suppressing certain ranks of the data during runtime of the navigation functions. Using suppression of ranks in this manner, some or all of the separate layers may be combined and rank suppression may be used as needed to reduce the number of records to be examined instead of providing separate layers.

In other alternative embodiments, aggregated segments and aggregated segment records may be formed in different ways. In the disclosed embodiments, using a rank attribute that defines separate layers represents one way by which aggregated segment records can be formed. However, in alternative embodiments, aggregated segment records may be formed without using rank attributes. For example, aggregated segments may be formed by taking into account traffic patterns or vehicle usage.

In further alternative embodiments, the navigation system should be understood to include any computer-based system that provides navigation functions to an end-user regardless of hardware platform or architecture. For example, the navigation system may include any kind of portable system, including hand-held systems, systems installed on personal digital assistants or notebook computers. In alternative embodiments, the navigation system may include navigation application software installed on a personal computer, such as a desktop computer. Further, the navigation system may be implemented in various different environments, including networked environments and client-server platform environments. The navigation application program and the geographic database need not be located in the same location, but may be connected over a network. The geographic database may be located remotely from the end-user and the data transmitted to the end-user over a wireless communications link.

In the embodiments described above, geographic data were described as being parcelized. In alternative embodiments, the geographic data may not be parcelized or may be organized in a different manner. These data records may be either compressed or not compressed.

In the embodiments described above, certain terminology is used to refer to components, data structures, and so on, in the navigation system, application, and database. Other terminology may be used to refer to these kinds of entities and it is understood that the subject matter disclosed herein is not intended to be limited to any particular terminology that expresses similar concepts.

It is intended that the foregoing detailed description be regarded as illustrative rather than limiting and that it is understood that the following claims including all equivalents are intended to define the scope of the invention.

We claim:

1. A method for forming a geographic database that contains data entities of more than one type comprising:

separating a plurality of data entities of a first type into a first plurality of parcels wherein each parcel of said first plurality of parcels includes a portion of said plurality of data entities of said first type;

separating a plurality of data entities of a second type into a second plurality of parcels wherein each parcel of said second plurality of parcels includes a portion of said plurality of data entities of said second type; and storing said first plurality of parcels and said second plurality of parcels in a geographic database, wherein said first plurality of parcels and said second plurality of parcels are interleaved with each other.

2. The method of claim 1 wherein said plurality of data entities of said first type are separated into parcels spatially.

3. The method of claim 1 wherein the plurality of data entities of said first type are separated into parcels so that the data entities in each parcel of said first plurality of parcels represent geographic features that are encompassed together within a rectangular area which is separate from rectangular areas that encompass geographic features that are represented by data entities contained in each of the other parcels of said first plurality of parcels.

4. The method of claim 1 wherein said plurality of data entities of said first type are separated into parcels spatially and wherein said plurality of data entities of second first type are separated into parcels spatially.

5. The method of claim 1 wherein the plurality of data entities of said first type are separated into parcels so that the data entities in each parcel of said first plurality of parcels represent geographic features that are encompassed together within a rectangular area which is separate from rectangular areas that encompass geographic features that are represented by data entities contained in each of the other parcels of said first plurality of parcels, and wherein the plurality of data entities of said second type are separated into parcels so that the data entities in each parcel of said second plurality of parcels represent geographic features that are encompassed together within a rectangular area which is separate from rectangular areas that encompass geographic features that are represented by data entities contained in each of the other parcels of said second plurality of parcels.

6. The method of claim 1 wherein data entities of said first type include attributes that represent segments of roads and wherein data entities of said second type include attributes that are abbreviated representations of segments of roads.

7. The method of claim 1 wherein said first type of data entities includes routing data and wherein said second type of data entities includes cartographic data.

8. The method of claim 1 wherein said first type of data entities includes point-of-interest data and wherein said second type of data entities includes cartographic data.

9. The method of claim 1 wherein data entities of said second type are indexes for the data entities of said first type.

10. The method of claim 1 wherein said steps of separating the pluralities of data entities of said first type, separating the pluralities of data entities of said second type and storing are performed by a compiler.

11. The method of claim 1 wherein said first plurality of parcels and said second plurality of parcels are interleaved according to a custom ordering defined by an arbitrary function that specifies an explicit ordering pattern.

* * * * *